(12) United States Patent
Hermanson et al.

(10) Patent No.: US 12,234,072 B2
(45) Date of Patent: Feb. 25, 2025

(54) PACKAGING MATERIAL AND METHOD OF FORMING A PACKAGING MATERIAL

(71) Applicant: Terry Hermanson, New York, NY (US)

(72) Inventors: Terry Hermanson, New York, NY (US); Huang Meng-Suen, Hong Kong (CN)

(73) Assignee: Terry Hermanson, New York, NY (US)

( * ) Notice: Subject to any disclaimer, the term of this patent is extended or adjusted under 35 U.S.C. 154(b) by 0 days.

(21) Appl. No.: 18/436,780

(22) Filed: Feb. 8, 2024

(65) Prior Publication Data
US 2024/0270463 A1 Aug. 15, 2024

Related U.S. Application Data

(60) Provisional application No. 63/484,021, filed on Feb. 9, 2023.

(51) Int. Cl.
*B65D 65/40* (2006.01)
*B32B 29/00* (2006.01)
(Continued)

(52) U.S. Cl.
CPC .......... *B65D 65/403* (2013.01); *B32B 29/005* (2013.01); *B32B 29/08* (2013.01);
(Continued)

(58) Field of Classification Search
CPC ...... B65D 65/403; B65D 5/3692; B65D 5/64; B65D 5/5054; B65D 5/5035;
(Continued)

(56) References Cited

U.S. PATENT DOCUMENTS 950,785 A   3/1910 Pene
1,710,543 A * 4/1929 Leo ............... B65D 5/5045
                                          206/459.5
(Continued)

FOREIGN PATENT DOCUMENTS

CA    2472739 A1   12/2005
CN   107984859 A    5/2018
(Continued)

OTHER PUBLICATIONS

"Corrugated Paper Board"; Easty Limited; https://www.eastyltd.com/Corrugated-Paper-board-CardBoard-p49.html (Accessed: Aug. 27, 2020).

(Continued)

*Primary Examiner* — Christopher R Demeree
(74) *Attorney, Agent, or Firm* — Venable LLP

(57) ABSTRACT

A packaging material and a cylindrical shipping box. The packaging material may be a convertible packaging material including an outer wall section and an inner wall section. The outer wall section has an outer surface formed thereon, and the inner wall section is formed of a plurality of segments. The convertible packaging material is convertible between a flat state and a tubular state. The cylindrical shipping box may include circumferential wall, a top cap, and a bottom cap. The circumferential wall is configurable in a flat configuration and a tubular configuration. The packaging material and the circumferential wall may include a plurality of triangular cells.

21 Claims, 18 Drawing Sheets

(51) Int. Cl.
  *B32B 29/08* (2006.01)
  *B65D 5/36* (2006.01)
  *B65D 5/64* (2006.01)
(52) U.S. Cl.
  CPC ............ *B65D 5/3692* (2013.01); *B65D 5/64* (2013.01); *B32B 2439/62* (2013.01)
(58) Field of Classification Search
  CPC ...... B65D 5/5045; B65D 5/5069; B65D 3/04; B65D 59/00; B65D 77/02; B65D 81/022; B65D 81/03; B32B 29/005; B32B 29/08; B32B 2439/62; B32B 2307/558; B32B 2307/56; B32B 15/12; B32B 2305/024; B32B 253/02; B32B 27/10; B32B 3/12; B32B 7/022; B21D 47/00; B29D 24/005; B31D 3/02; D21H 1/02; D21H 27/10
  USPC ................. 229/247, 919, 4.5, 5.5; 206/814; 428/116, 178, 593, 182, 184, 73
  See application file for complete search history.

(56) References Cited

U.S. PATENT DOCUMENTS

| | | | |
|---|---|---|---|
| 2,020,639 A | | 11/1935 | Grayson et al. |
| 2,115,745 A | | 5/1938 | Page |
| 3,542,636 A | | 11/1970 | Wandel |
| 3,574,103 A | | 4/1971 | Latkin |
| 3,669,820 A | * | 6/1972 | Fredericks ................ E04C 2/40 |
| | | | 428/184 |
| 3,741,859 A | | 6/1973 | Wandel |
| 3,756,904 A | * | 9/1973 | Fredericks ................ B32B 3/12 |
| | | | 428/184 |
| 4,039,708 A | | 6/1977 | Seltz et al. |
| 4,034,135 A | | 7/1977 | Passmore |
| 5,007,579 A | * | 4/1991 | Thomas, Jr. ............. B65D 3/10 |
| | | | 229/5.5 |
| 5,102,036 A | | 4/1992 | Orr et al. |
| 5,270,095 A | * | 12/1993 | Ito ............................ E04C 2/36 |
| | | | 156/196 |
| 5,799,861 A | | 9/1998 | Bonner et al. |
| 6,190,756 B1 | | 2/2001 | Yokoyama et al. |
| 7,614,201 B2 | | 11/2009 | Cabanski et al. |
| 2010/0227116 A1 | * | 9/2010 | Leylekian ............... E04C 2/326 |
| | | | 428/116 |
| 2019/0241342 A1 | | 8/2019 | Kling |

FOREIGN PATENT DOCUMENTS

| | | |
|---|---|---|
| CN | 111070843 A | 4/2020 |
| DE | 3817490 A1 | 11/1989 |
| DE | 9414805 U1 | 11/1994 |
| DE | 4319792 A1 | 12/1994 |
| DE | 202004010558 U1 | 9/2004 |
| DE | 102007005001 A1 | 8/2008 |
| DE | 102015109972 A1 | 12/2016 |
| EP | 3415443 A | 12/2018 |
| GB | 689693 A | 4/1953 |
| GB | 1119244 A | 7/1968 |
| GB | 2368074 A | 4/2002 |
| JP | 2009-513383 A | 4/2009 |
| KR | 100832094 B1 | 5/2008 |
| KR | 101085309 B1 | 11/2011 |
| WO | 02/102592 A1 | 12/2002 |

OTHER PUBLICATIONS

"Hexacomb Packaging"; Packaging Corporation of America; https://www.packagingcorp.com/packaging-solutions/need/protect-products/hexacomb/ (Accessed: Aug. 27, 2020).
"Layered Cardboard Sheet at the best price"; https://www.mwmaterialsworld.com/en/layered-cardboard-sheet.html (Accessed: Aug. 27, 2020).
"Production of Honeycomb Cardboard for sandwich panels"; Bui Giordano; https://www.giordanobui.com/en/main-products/honeycomb-panel/ (Accessed: Aug. 27, 2020).
"Honeycomb by Multi-Wall" brochure from Multi-Wall Packaging (https://www.multiwall.com/honeycomb/); downloaded Aug. 10, 2020.
"Sculpture7"; The Art Teacher (https://artteacherblog.wordpress.com/2016/04/26/cardboard-sculpture/sculpture7/#main) (Accessed: Feb. 8, 2024).
Search Report dated Jun. 12, 2024, in International Patent Application No. PCT/US2024/015011.

\* cited by examiner

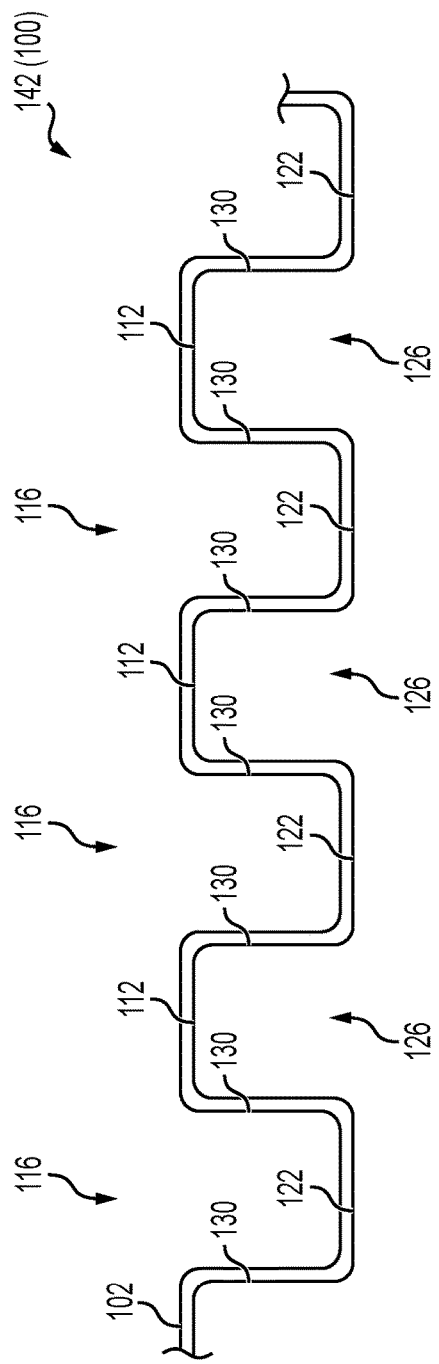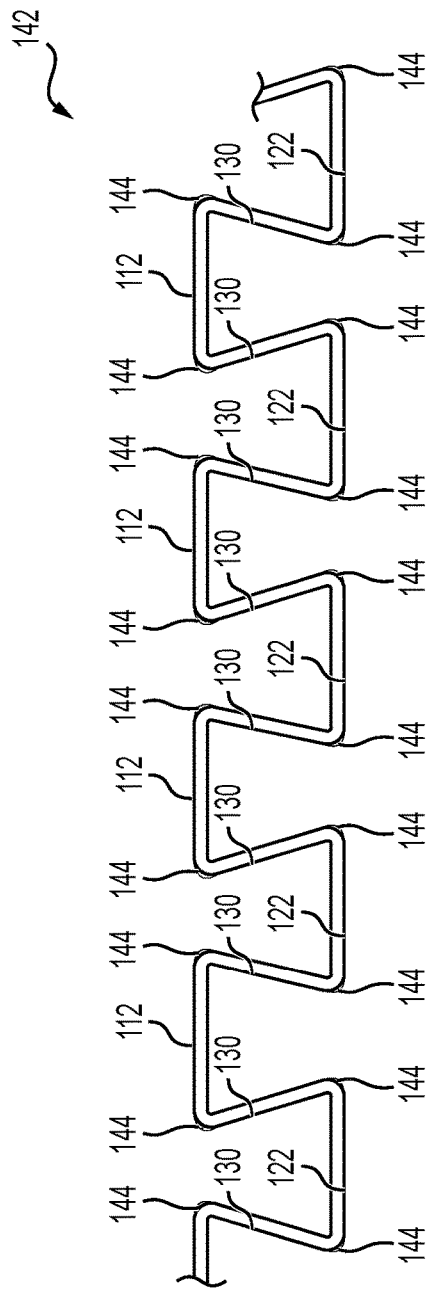

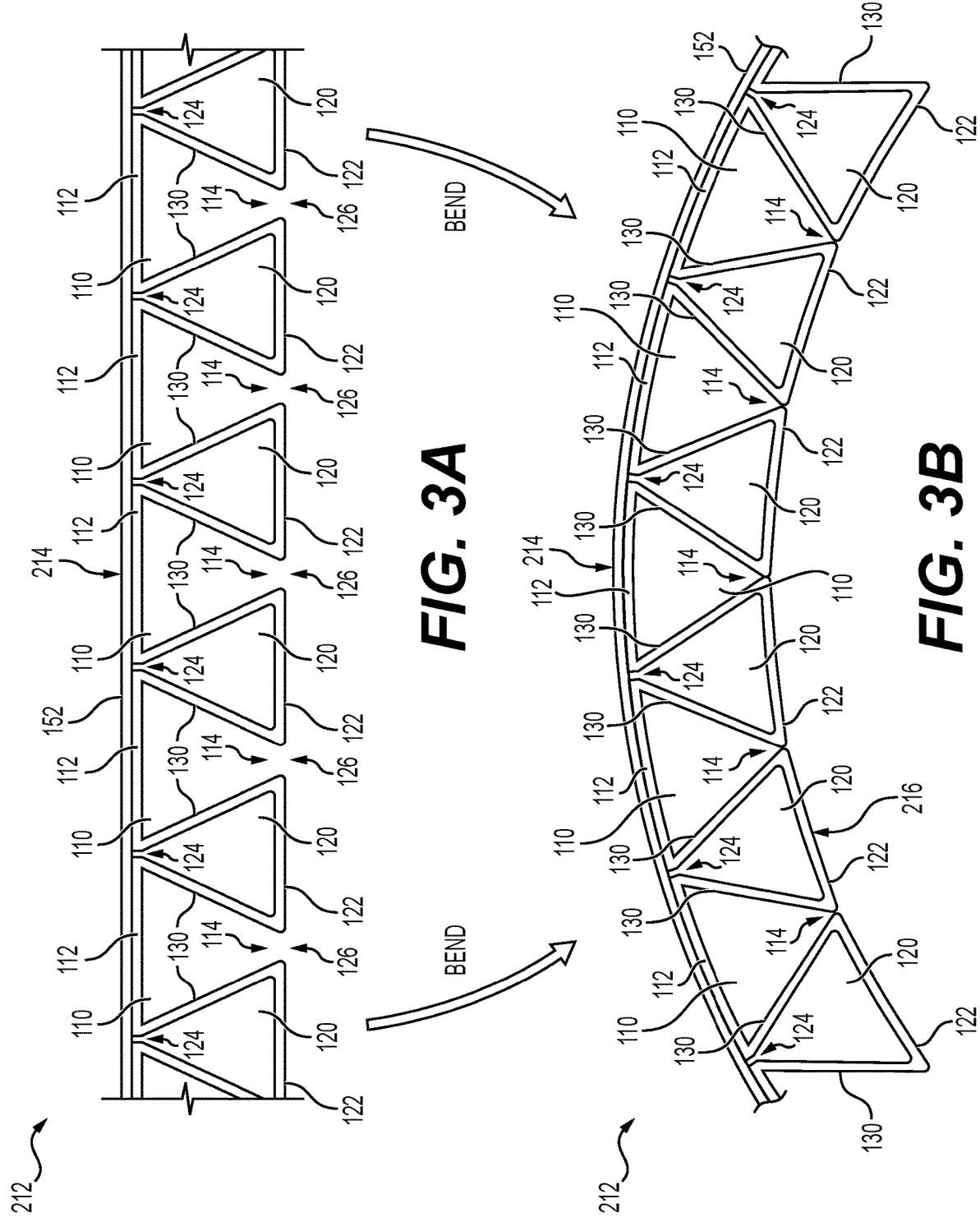

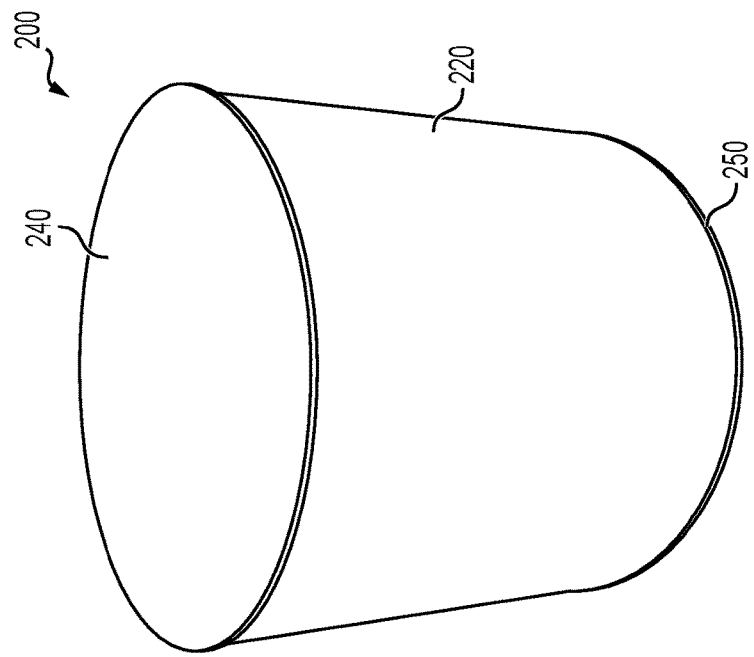
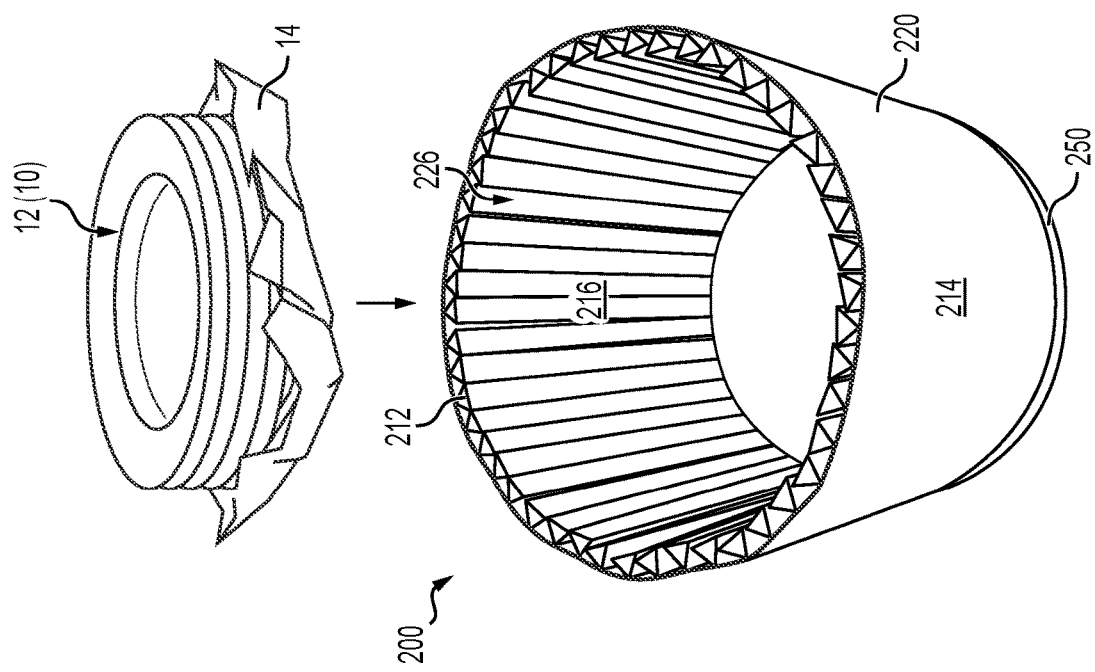
FIG. 5C
FIG. 5B

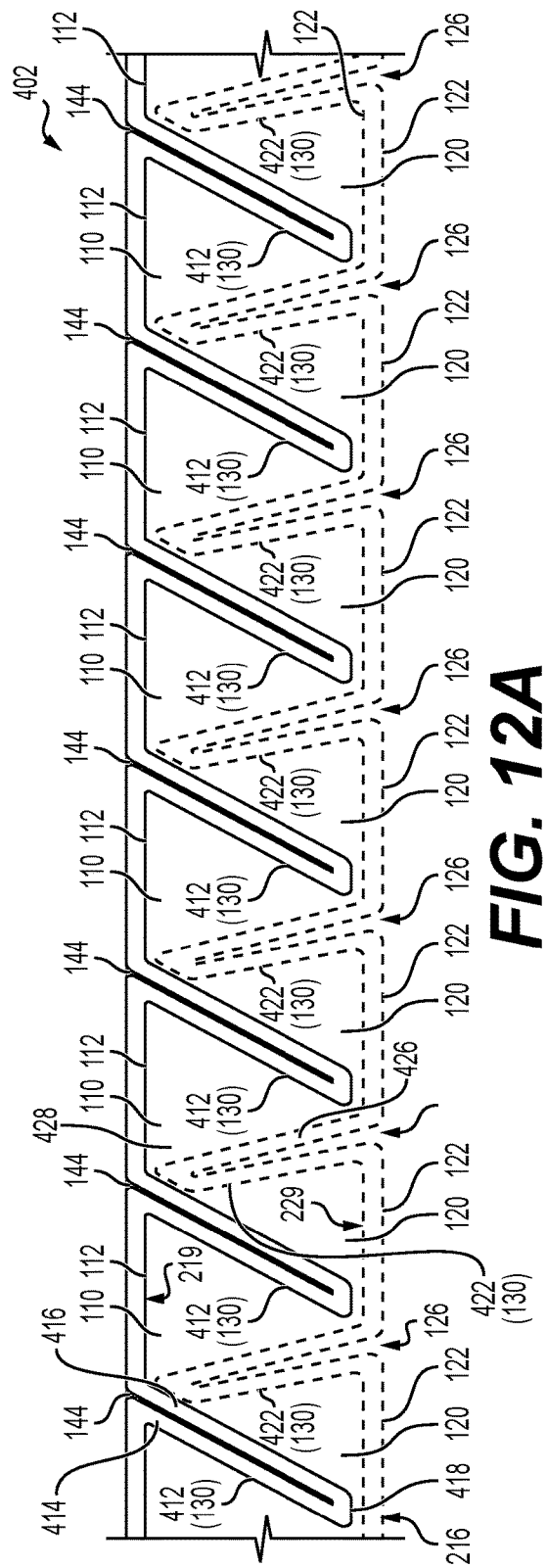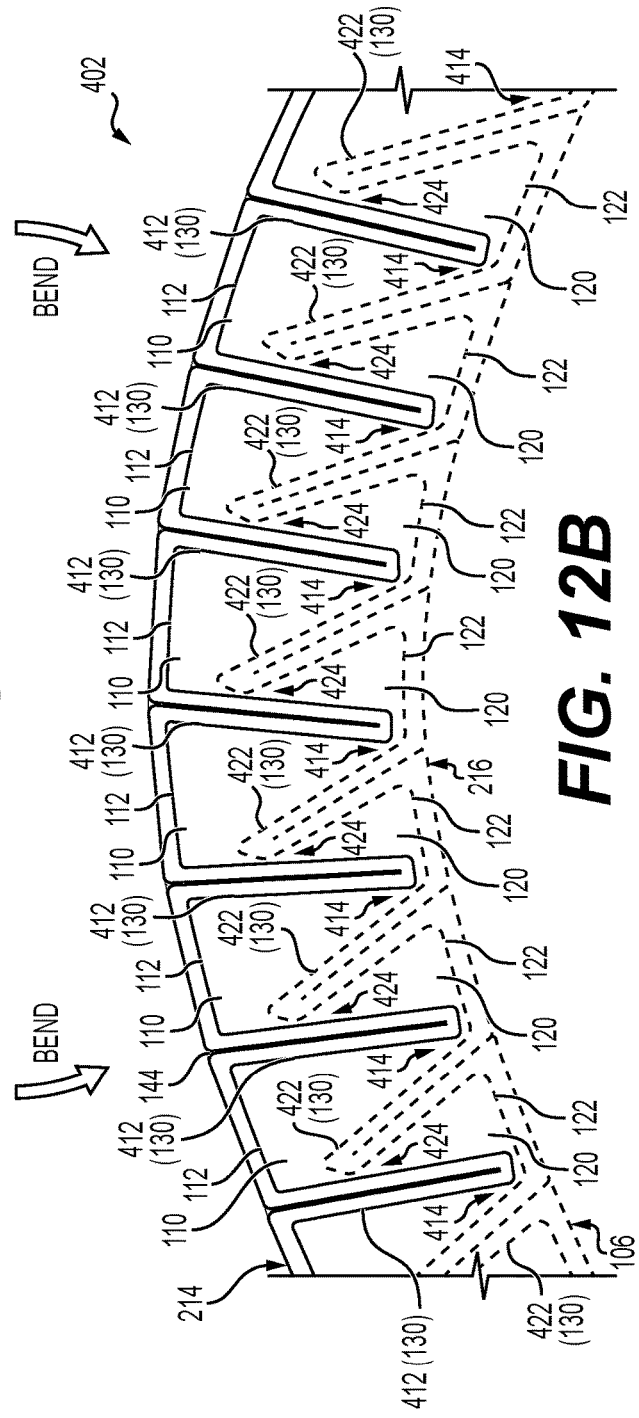

PACKAGING MATERIAL AND METHOD OF FORMING A PACKAGING MATERIAL

CROSS-REFERENCE TO RELATED APPLICATIONS

This application claims the benefit under 35 U.S.C. § 119(e) of U.S. Provisional Patent Application No. 63/484,021, filed Feb. 9, 2023, and titled "PACKAGING MATERIAL AND METHOD OF FORMING A PACKAGING MATERIAL," the entirety of which is incorporated herein by reference.

FIELD OF THE INVENTION

The invention relates to packaging material. In particular, the invention relates to packaging material, such as a shipping container, formed from corrugated fiberboard.

BACKGROUND OF THE INVENTION

Products are shipped in packaging material made from corrugated fiberboard (corrugated cardboard). Many products require shipping boxes that are stronger than the strength (such as burst strength) available from a shipping box formed from a single wall of corrugated fiberboard. Stronger shipping boxes may be formed by laminating two or three layers of corrugated fiberboard together to form doubled-walled or triple-walled, respectively, shipping boxes.

SUMMARY OF THE INVENTION

In one aspect, the invention relates to a packaging material including a plurality of triangular cells. The plurality of triangular cells may be formed from the same continuous sheet or a plurality of sheets, such a s a first sheet and second sheet.

In another aspect, the invention relates to a knock-down-flat cylindrical shipping box including circumferential wall, a top cap, and a bottom cap. The circumferential wall includes an outer surface and an inner surface. The circumferential wall is configurable in a flat configuration and a tubular configuration. When the circumferential wall is in the tubular configuration, the inner surface defines an inner cavity for an item-to-be-shipped to be placed therein and forms a top-end opening and a bottom-end opening. The top cap is attachable to the circumferential wall in the tubular configuration to close the top-end opening, and the bottom cap attachable to the circumferential wall in the tubular configuration to close the bottom-end opening.

In a further aspect, the invention relates to a convertible packaging material including an outer wall section and an inner wall section. The outer wall section has an outer surface formed thereon, and the inner wall section is formed of a plurality of segments. The packaging material is convertible between a flat state and a tubular state, and in the tubular state the, the inner wall section forms an inner surface defining an inner cavity.

These and other aspects of the invention will become apparent from the following disclosure.

BRIEF DESCRIPTION OF THE DRAWINGS

FIGS. 2A-2D illustrate a process for forming the packaging material shown in FIG. 1. FIGS. 2A-2D are end views of the packaging material shown in FIG. 1. FIG. 2A illustrates a first step, FIG. 2B illustrates a second step, FIG. 2C illustrates a third step, and FIG. 2D illustrates a fourth step.

FIGS. 3A, 3B and 3C, show a packaging material according to another embodiment in a configuration used to form a cylindrical shipping box. FIG. 3A shows the packaging material in a flat state, and FIG. 3B shows the packaging material in a bent state. FIG. 3C show a variation of the packaging material shown in FIG. 3A.

FIGS. 5A-5C also illustrate the cylindrical shipping box of FIG. 4 in different conditions. FIG. 5A shows the components of the shipping box in a flat condition. FIG. 5B shows the cylindrical shipping box in an assembled condition ready for packing an item-to-be-shipped therein with the top cap removed. FIG. 5C shows the cylindrical shipping box in the assembled condition with the top cap installed.

FIG. 8A is a top view of the shipping container, and FIG. 8B is a side view of the shipping container.

FIG. 9A is a top view of the shipping container, and FIG. 9B is a side view of the shipping container.

FIG. 10A shows the packaging material in a flat state, and FIG. 10B shows the packaging material in a bent state.

FIG. 11A is a perspective view of the packaging material, and FIG. 11B is an end view of the packaging material.

FIGS. 12A and 12B, show a packaging material according to another embodiment in a configuration used to form a cylindrical shipping box. FIG. 12A shows the packaging material in a flat state, and FIG. 12B shows the packaging material in a bent state.

DETAILED DESCRIPTION OF THE PREFERRED EMBODIMENTS

As noted above, stronger shipping boxes may be formed by laminating two or three layers of corrugated fiberboard together to form doubled-walled or triple-walled, respectively, shipping boxes. Double-walled or triple-walled shipping boxes, however, are relatively thick. The thicker material increases cube costs, shipping costs, and storage costs. Thus, a packaging material that creates more strength with less thickness is desired. Such a material could result in enormous savings in these costs. The packaging material discussed herein may be used to form shipping boxes having a higher strength than a single layer of corrugated fiberboard, with a thickness that is less than that of double-walled or triple-walled shipping boxes.

In addition, shipping boxes formed of corrugated fiberboard, particularly those that are double-walled or triple-walled do not readily form alternative shapes and instead are generally limited to rectangular shipping boxes. When round or cylindrical items are shipped in such rectangular shipping boxes, the rectangular boxes thus include void space around the item-to-be-shipped resulting in increased costs for filler material. Further if this void space can be eliminated, more shipping boxes may be included in a shipping container also resulting in enormous savings in these costs. Embodiments of the packaging material discussed herein can also be formed into cylindrical shipping boxes.

Embodiments of the packaging material discussed herein may be used to form shipping boxes. Shipping boxes, as used herein, refers to a container used for shipping (transporting) or otherwise packing an item therein. This item may be referred to herein as an item-to-be-shipped. The term shipping box is not limited to square or rectangular shipping boxes; instead, as used herein, shipping boxes may have other shapes such as the cylindrical shapes discussed below. The term shipping box is used to distinguish from the term shipping container, which is also used herein. Shipping container, as used herein, generally refers to an intermodal freight container. Such intermodal freight containers (shipping containers) are truck size, reusable, typically steel (or other metal) containers that are used to transport goods by ship, train, and truck.

Figure 1:
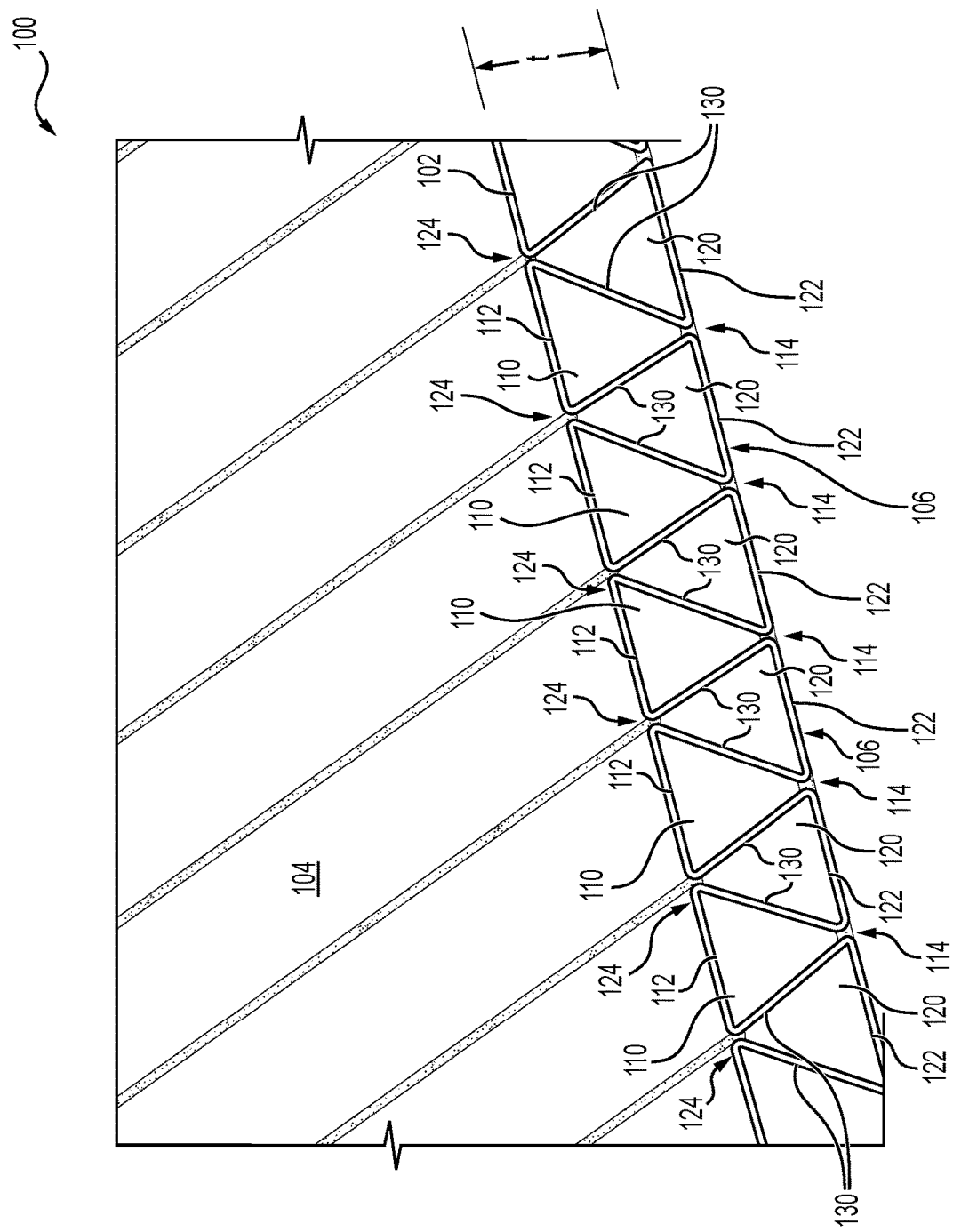
FIG. 1 is a perspective view of a packaging material of an embodiment of the disclosure.

FIG. 1 shows a packaging material 100 of an embodiment. The packaging material 100 may be formed from single-walled corrugated fiberboard 102. Corrugated fiberboard is sometimes also referred to as corrugated cardboard. Although not explicitly depicted in FIG. 1, the single-walled corrugated fiberboard 102 may include a top sheet, a bottom sheet, and one corrugated sheet sandwiched between the top sheet and the bottom sheet. The top sheet and the bottom sheet may be flat containerboard or paperboard material formed from cellulosic material (e.g., natural cellulosic fibers). The corrugated sheet includes a plurality of flutes. Any suitable standard flute shape typically used in the construction of cardboard shipping boxes may be used.

The packaging material 100 shown in FIG. 1 includes a first surface and a second surface. For ease of reference herein, the first surface will be referred to as a top surface 104 and the second surface will be referred to as a bottom surface 106, but depending upon use the surfaces may have different orientations, such as outer surfaces and inner surfaces, as discussed further below. As will be discussed in more detail below, the single-walled corrugated fiberboard 102 is folded or otherwise shaped to form a plurality of triangularly shaped cells and, more specifically, a plurality of first triangular cells 110 and a plurality of second triangular cells 120. The first triangular cells 110 and second triangular cells 120 are arranged in an alternating pattern with each of the first triangular cells 110 is adjacent to and, more specifically, between two of the second triangular cells 120 and, similarly, with the exception of an end cell, each of the second triangular cells 120 is adjacent to and, more specifically, between two of the first triangular cells 110. The end cells, however, are adjacent to only one cell. If one of the first triangular cells 110 is on the end (an end cell), the end cell of the first triangular cells 110 is adjacent to one of the second triangular cells 120 and, similarly, if one of the second triangular cells 120 is on the end (an end cell), the end cell of the second triangular cells 120 is adjacent to one of the first triangular cells 110. Each of the plurality of triangular cells (i.e., the first triangular cells 110 and the second triangular cells 120) have a longitudinal axis, which in the depicted embodiment, extends in a direction parallel to the top surface 104, the bottom surface 106, or both.

Each of the first triangular cells 110 includes a base portion, which is referred to herein as a first base portion 112. The first base portion 112 is a portion of the single-walled corrugated fiberboard 102, and collectively, the plurality of first base portions 112 forms a top wall. The top surface 104 is an outer surface of the top wall. Similarly, each of the second triangular cells 120 includes a base portion, which is referred to herein as a second base portion 122. The second base portion 122 is a portion of the single-walled corrugated fiberboard 102, and collectively, the plurality of second base portions 122 forms a bottom wall. The bottom surface 106 is an outer surface of the bottom wall. The first triangular cells 110 and the second triangular cells 120 are thus arranged in an interlocking pattern.

The packaging material 100 also includes a plurality of transverse walls 130. In this embodiment, a transverse wall 130 is a portion of the single-walled corrugated fiberboard 102 that extends transversely to the top surface 104 and the bottom surface 106. The packaging material 100, or at least a portion thereof, is formed from a continuous sheet (i.e., the single-walled corrugated fiberboard 102 in this embodiment), and each transverse wall 130 connects one of the first base portions 112 with one of the second base portions 122, forming a side of one of the triangularly shaped cells. The transverse wall 130 separates one first triangular cells 110 from an adjacent second triangular cells 120. Two transverse walls 130 are brought together opposite a base portion to form the apex of the triangular cell. More specifically, two transverse walls 130 may be brought together opposite the first base portion 112 to form a first apex 114 of one of the first triangular cells 110, and two transverse walls 130 may be brought together opposite the second base portion 122 to form a second apex 124 of one of the second triangular cells 120. The transverse walls 130 attach to the ends of the first base portion 112 and the second base portion 122. In the depicted embodiment, each end of the first base portion 112 abuts an end of an adjacent first base portion 112 at the second apex 124, and each end of the second base portion 122 abuts an end of an adjacent second base portion 122 at the first apex 114. In some embodiments, an adhesive 144 (FIG. 2B) may be at each of the first apexes 114 and each of the second apexes 124. Any suitable adhesive 144 may be used, but in this embodiment and throughout the embodiments discussed herein, the adhesive 144 is preferably a biodegradable adhesive.

The transverse walls 130 of the depicted embodiment have the same length and thus the first triangular cells 110 and the second triangular cells 120 may be isosceles triangles or equilateral triangles. In some embodiments, the first base portion 112 and/or the second base portion 122 is the same length as each of the transverse walls 130, but in other embodiments the first base portion 112 and/or the second base portion 122 has a length that is greater or less than each of the transverse walls 130. The first triangular cells 110 and the second triangular cells 120 are each acute isosceles triangles in FIG. 1, but other shapes may be used, such as obtuse triangles, as discussed further below. The numbers, size, and density of the cells may be varied according to the overall crush, burst, and flexibility desired. The angles of the vertices and length of the first base portion 112, the second base portion 122, and the transverse walls 130 of the triangular cells may be varied to adjust the properties of the packaging material 100. The packaging material 100 may thus have a total thickness t. In one example, the total thickness t is 5 mm.

Figure 2C:
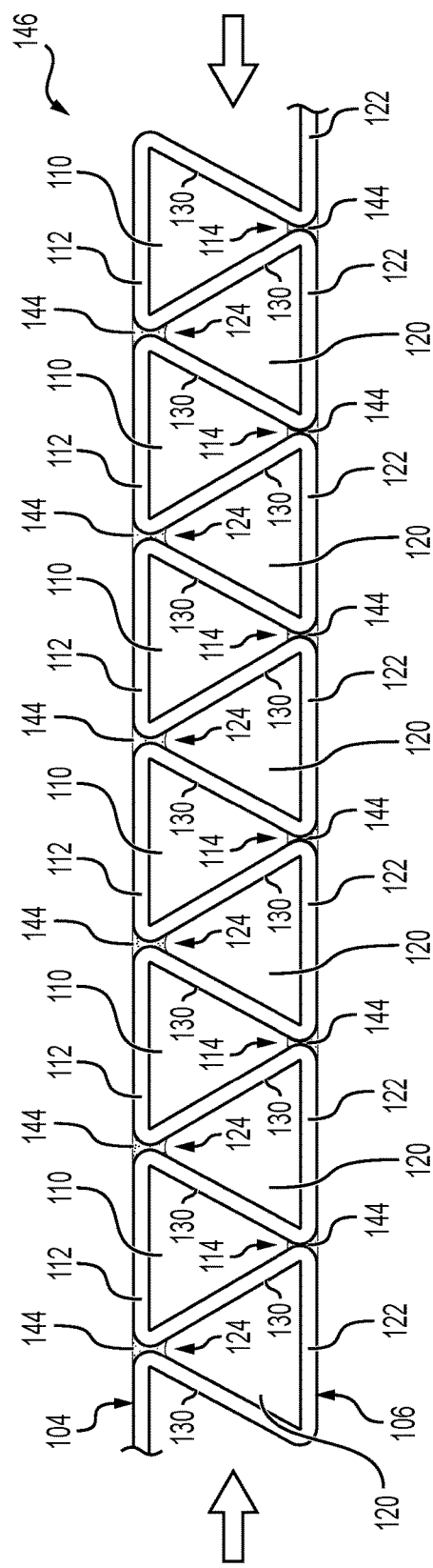

A process for forming the packaging material 100 is shown in FIGS. 2A-2D. FIG. 2A illustrates a first step. In the first step, the single-walled corrugated fiberboard 102 is folded, such as into flutes, forming a folded corrugated-fiberboard sheet 142 and, more specifically, forming the first base portion 112, the second base portion 122, and the transverse walls 130. In this step, gaps (referred herein to as first-side gaps) 116 may be present between adjacent first base portions 112, and gaps (referred herein to as second-side gaps) 126 may be present between adjacent second base portions 122.

FIG. 2B illustrates a second step. In the second step and adhesive 144, if used, is applied to ends of the first base portion 112 and/or ends of the second base portion 122. In the depicted embodiment, the adhesive 144 is applied to each end of the first base portion 112 and/or the second base portion 122.

FIG. 2C illustrates a third step. After or while the adhesive 144 is applied, the folded corrugated-fiberboard sheet 142 is cramped and formed into triangular cells (e.g., the first triangular cells 110 and the second triangular cells 120). The first base portions 112 and the second base portions 122 are thus positioned relative to each other to form the first triangular cells 110 and the second triangular cells 120 with the transverse walls 130. A cramping force is applied longitudinally to the folded corrugated-fiberboard sheet 142 to close the first-side gaps 116 and the second-side gaps 126 forming the first triangular cells 110 and the second triangular cells 120. In the depicted embodiment, the cramping force is applied to form fully closed cells (e.g., the first triangular cells 110 and the second triangular cells 120). With the ends of adjacent first base portion 112 and ends of adjacent second base portion 122 respectively abutting each other, the first apexes 114 and the second apexes 124 are formed and, in the depicted embodiment, the adhesive 144 holds the first apexes 114 and the second apexes 124. The third step forms a cramped corrugated-fiberboard sheet 146, and in some embodiments, the cramped corrugated-fiberboard sheet 146 is the packaging material 100 after the adhesive 144 dries.

Figure 2D:
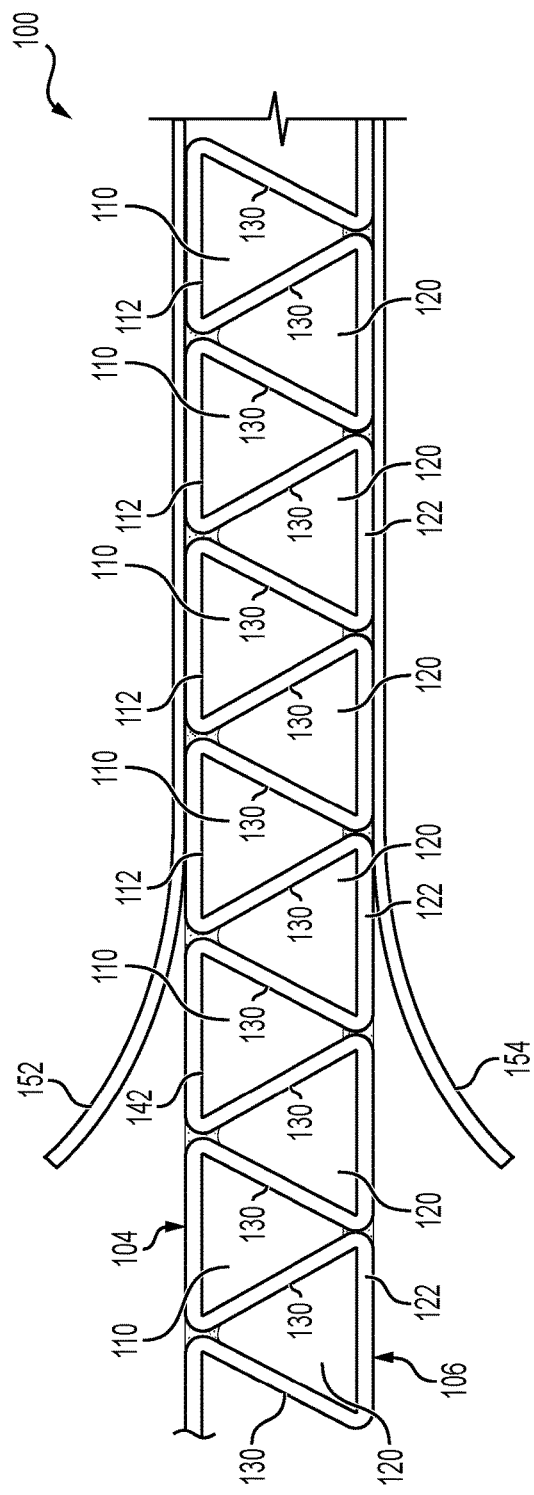

FIG. 2D illustrates a fourth step, which is optional. One or more sheets may be applied to the cramped corrugated-fiberboard sheet 146. As depicted in FIG. 2D, a top sheet 152 is applied to the top surface 104, and a bottom sheet 154 is applied to the bottom surface 106. The top sheet 152 and/or bottom sheet 154 may be a cellulosic sheet. In some embodiments, the cellulosic sheet is a flexible, cellulosic sheet, such as paper, but stiffer cellulosic sheets may be used, such as containerboard, fiberboard, or even a corrugated material, such as single-walled corrugated fiberboard. The top sheet 152 and the bottom sheet 154 may be laminated to the top surface 104 and the bottom surface 106, respectively, using an adhesive.

Figure 3C:
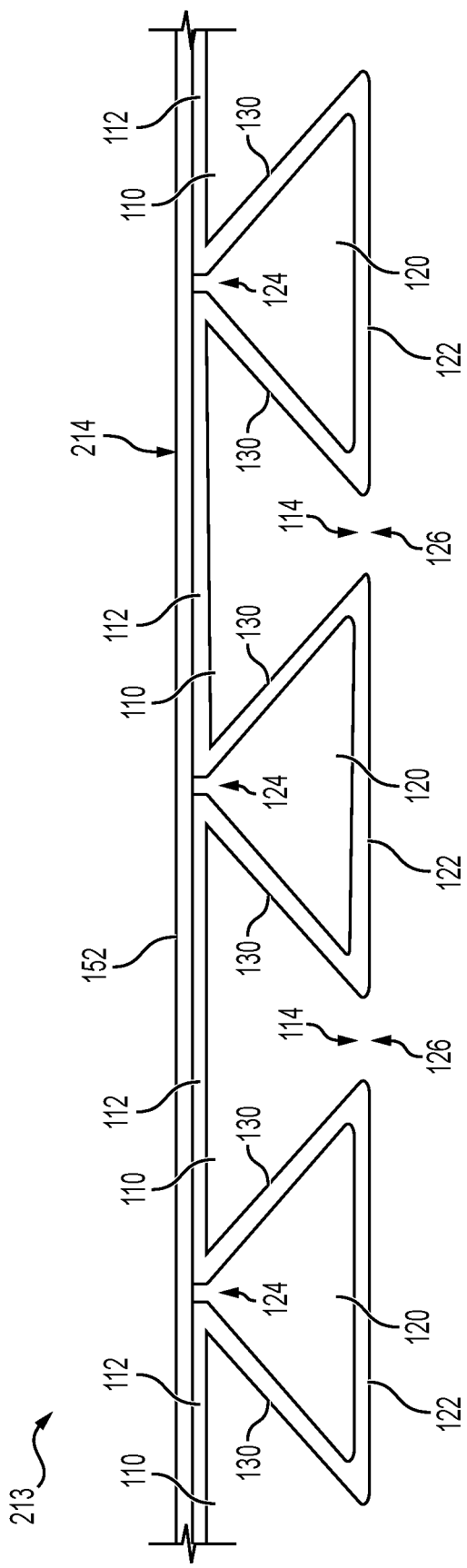
Figure 4:
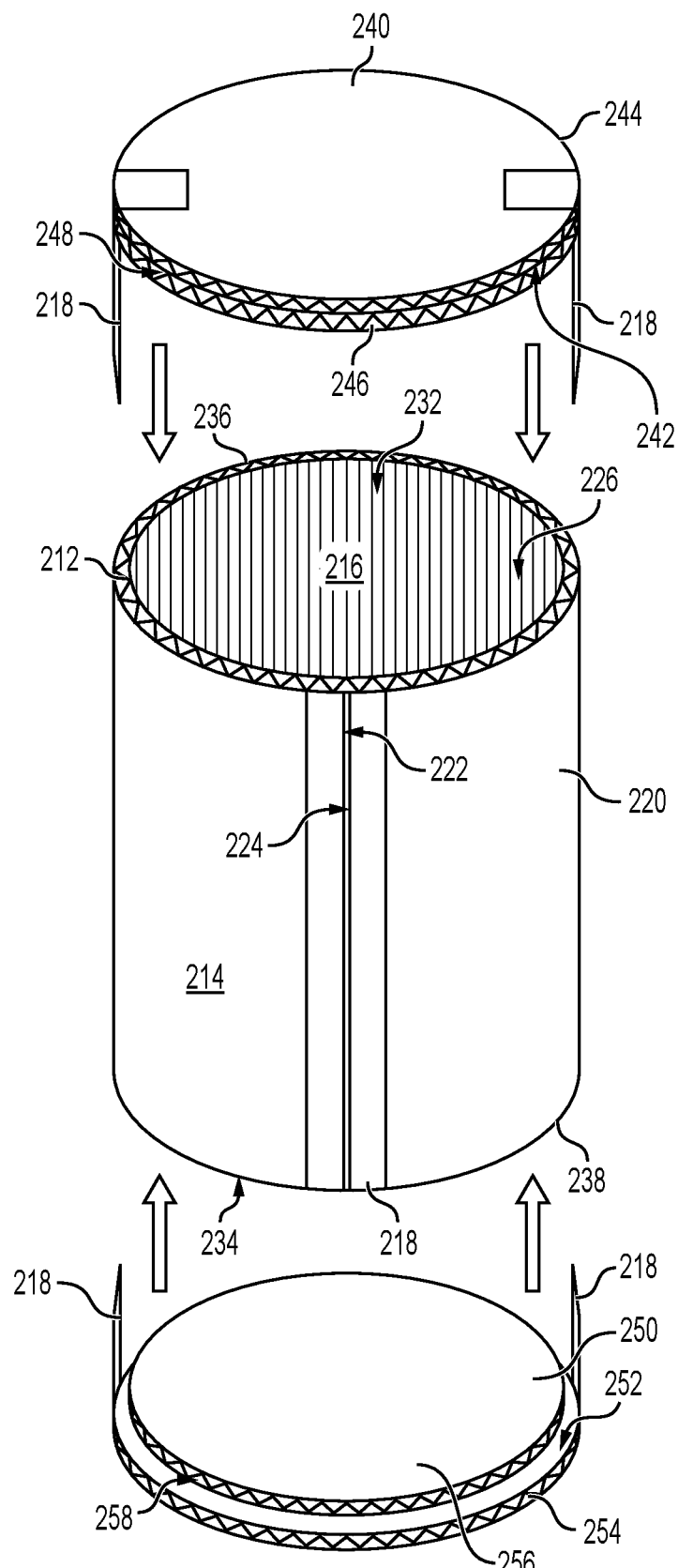
FIG. 4 is an exploded view of a cylindrical shipping box formed from the packaging material shown in FIGS. 3A and 3B.

FIGS. 3A and 3B show a packaging material 212 that may be used to form a circumferential wall 220 (FIG. 4) of a cylindrical shipping box 200 (FIG. 4). The packaging material 212 is similar to the packaging material 100 discussed above. The same reference numerals will be used for the same and similar components and features, and a detailed description of these features is omitted here. The packaging material 212 is configurable in a flat configuration, shown in FIG. 3A, and a tubular configuration, shown in FIG. 3B. The packaging material 212 of this embodiment provides a "knock-down-flat" ("kdf") shipping box (cylindrical shipping box 200), as will be discussed further below.

In this embodiment, the first surface is an outer surface 214 similar to the top surface 104 discussed above, and the second surface is an inner surface 216 similar to the bottom surface 106 discussed above. Collectively, the plurality of first base portions 112 of forms an outer wall (also referred to as an outer wall section), and collectively, the plurality of second base portions 122 forms an inner wall (also referred to as an inner wall section). The outer surface 214 is an outer surface of the outer wall, and the inner surface 216 in an outer surface of the inner wall. In the flat configuration, adjacent second base portions 122 are spaced apart from each other and a second-side gap 126 is maintained between adjacent second base portions 122. In the flat configuration, the second triangular cells 120 are thus spaced apart from each other and the first triangular cells 110 are open triangular cells opposite the first base portion 112 (i.e., at the first apex 114). The second apex 124 of the second triangular cells 120 may be adhered to each other in the manner discussed above, such as by the adhesive 144 applied at the second apex 124, a top sheet 152 being applied to the outer surface 214, or both. Although depicted in FIGS. 3A and 3B, the top sheet 152 may be optional in this embodiment. To form this spaced-apart arrangement when flat, the first base portion 112 is longer than a corresponding second base portion 122 to which it is connected, and the first triangular cells 110 are free from attachment at the first apex 114, such as without the adhesive 144 applied at the first apex 114. Each of the first base portions 112 may be longer than each of the second base portions 122.

The packaging material 212 can be bent to form an arcuate shape, such as a tubular shape (see FIG. 4), as shown in FIG. 3B. As the packaging material 212 is bent, the second base portions 122 are brought closer to each other reducing the distance (i.e., size) of the second-side gaps 126 between adjacent second base portions 122. More specifically, adjacent the second base portions 122 may be brought into contact with each other (i.e., the second base portions 122 abut each other), closing the second-side gaps 126 and forming a closed first apex 114 of each of the first triangular cells 110. With the first apex 114 being free from attachment as discussed above, the packaging material 212 can move back and forth between the arcuate (or tubular) configuration shown in FIG. 3B and the flat configuration shown in FIG. 3A.

As noted above, the numbers, size, and density of the cells may be varied and angles of the vertices forming the triangular cells may be varied. FIG. 3C shows a packaging material 213 that is a variation of the packaging material 212 shown in FIG. 3A. FIG. 3C shows the packaging material 213 in a flat state. The packaging material 213 depicted in FIG. 3C is similar to the packaging material 212 shown in FIG. 3A, but includes first triangular cells 110 and second triangular cells 120 that have an obtuse triangular shape. More specifically, the angles between the transverse walls 130 at the first apex 114 and the second apex 124 are obtuse, forming an obtuse triangle and, more specifically in the depicted embodiment and obtuse isosceles triangle. With the transverse walls 130 at this angle, the packaging material 213 may be less rigid and provide an increased cushioning effect compared to the packaging material 212 shown in FIG. 3A. As depicted in FIG. 3C, the length of the base portion (i.e., the first base portion 112 or the second base portion 122) may be longer than each of the transverse walls 130.

Although shown and described as a convertible packaging material, with gaps 126 that allow the packaging material 213 to be bent into a tubular shape or contoured into other suitable shapes, the obtuse triangular cells depicted in FIG. 3C, may be used with the other embodiments discussed herein. For example, the packaging material 100 shown in FIGS. 1 to 2D may include the obtuse isosceles triangular cells depicted in FIG. 3C with the second base portions 122 abutting each other. In another example, the first fins 412 and the second fins 422, discussed further below, may be oriented to form the shapes depicted herein. As noted above, the top sheet 152 may be optional.

FIG. 4 is an exploded view of a cylindrical shipping box 200. The cylindrical shipping box 200 includes a circumferential wall 220, and as noted above, the packaging material 212 shown in FIGS. 3A and 3B may be used to form the circumferential wall 220. The packaging material 212 is bent from the flat configuration (FIG. 3A) to form a tubular shape (FIG. 3B). The circumferential wall 220 includes an axial direction and the longitudinal direction of the plurality of triangular cells of the packaging material 212 (e.g., the first triangular cells 110 and the second triangular cells 120) extends in the axial direction of the cylindrical shipping box 200. The packaging material 212 may include a first edge 222 and a second edge 224 and the packaging material 212 is bent to bring the first edge 222 and the second edge 224 into contact with each other. The first edge 222 and the second edge 224 are held in place to hold the packaging material 212 in the tubular configuration. An adhesive strip 218, such as tape, may be used to secure the first edge 222 and the second edge 224 and maintain the packaging material 212 in the tubular shape.

The circumferential wall 220 includes openings at each end and, more specifically, a top-end opening 232 and a bottom-end opening 234. The cylindrical shipping box 200 includes a top cap 240 and a bottom cap 250 to close the top-end opening 232 and the bottom-end opening 234, respectively. The inner surface 216 defines an inner cavity 226 having an inner diameter. The top cap 240 and the bottom cap 250 are thus each preferably sized to be larger than the inner diameter. The top cap 240 and the bottom cap 250 may each be circular with an overall diameter that is larger than the inner diameter of the inner cavity 226. The outer surface 214 may define an outer diameter of the circumferential wall 220 and the overall diameter may substantially correspond to the outer diameter of the circumferential wall 220.

The circumferential wall 220 includes a top end 236 and a bottom end 238. In the depicted embodiment, the top cap 240 is placed to abut the top end 236 of the circumferential wall 220, and the bottom cap 250 is plate to abut the bottom end 238 of the circumferential wall 220. More specifically, the top cap 240 includes an inward facing surface 242 that abuts the top end 236, and the bottom cap 250 includes an inward facing surface 252 that abuts the bottom end 238. The top cap 240 and the bottom cap 250 may be attached to the circumferential wall 220, such as by using one or more adhesive strips 218.

Each of the top cap 240 and the bottom cap 250 may be made of the same material as the circumferential wall 220, such as single-walled corrugated fiberboard. As depicted in FIG. 4, each of the top cap 240 and the bottom cap 250 are multi-layer. The top cap 240 includes an outer layer 244 and an inner layer 246. The overall dimensions of the top cap 240 discussed above apply to the outer layer 244, and the inner layer 246 is sized and shaped to be inserted into the inner cavity 226. As depicted in FIG. 4 the inner layer 246 is circular having a diameter that is less than the overall diameter of the outer layer 244 and is the inner diameter of the inner cavity 226 or less. This inner layer 246 may provide a bearing surface 248, on which the inner surface 216 bears or presses against when an inward force is applied to the outer surface 214 of the circumferential wall 220. The bearing surface 248 may be the outer circumferential surface of the inner layer 246. The inner layer 246 may thus provide structural support for the circumferential wall 220 and help maintain the shape of the circumferential wall 220. The inward facing surface 242 is formed on the outer layer 244 and the inner layer 246 may be attached, such as by an adhesive to the inward facing surface 242.

The bottom cap 250 also includes an outer layer 254 and an inner layer 256 with a bearing surface 258. The outer layer 254 of the bottom cap 250 is similar to the outer layer 244 of the top cap 240, and the inner layer 256 of the bottom cap 250 is similar to the inner layer 246 of the top cap 240. The discussion of the features of the top cap 240 applies to corresponding features of the bottom cap 250.

Figure 5A:
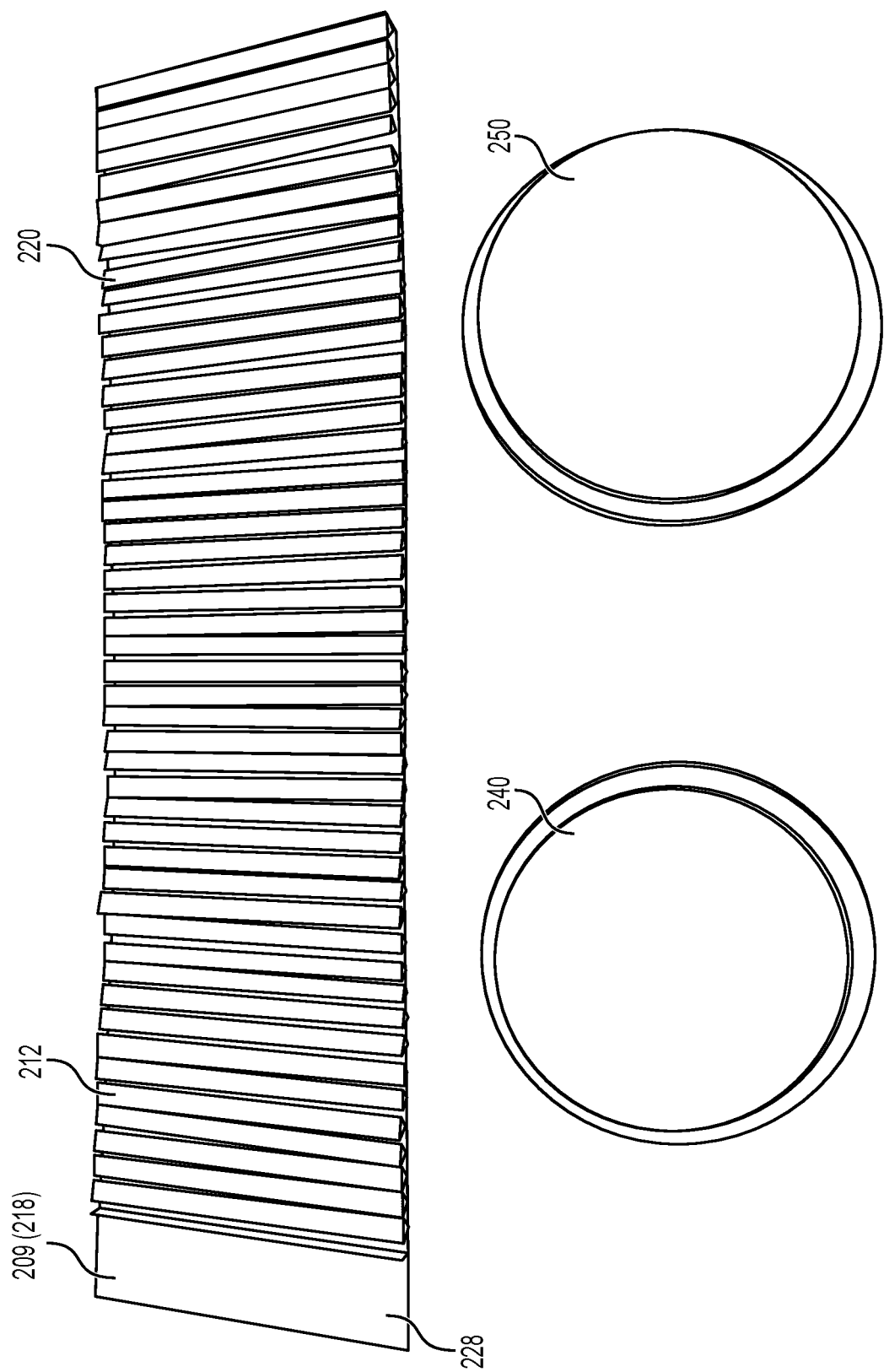

FIGS. 5A-5C illustrate the process of forming the cylindrical shipping box 200 and packing an item-to-be-shipped 10 therein. FIG. 5A shows the components of the cylindrical shipping box 200 including the circumferential wall 220 in a flat configuration. As noted above, the packaging material 212 used to form the circumferential wall 220 provides a "knock-down-flat" ("kdf") shipping box. As used herein "knock down flat" refers to a shipping box that can be assembled and disassembled into a flat state for storage or shipping of just the packaging material (i.e., the packaging material 212, the top cap 240, and the bottom cap 250) without the item-to-be-shipped 10. The cylindrical shipping box 200 of this embodiment provides a cylindrical box with all the advantages (e.g., strength) of a strong triangular construction of the packaging material 212. With the kdf tubes in the flat state, as shown in FIG. 5A, the kdf tubes can be shipped and stored flat with cube savings of 80%-90% in comparison with regular tubing.

To form the cylindrical shipping box 200, the packaging material 212 used for the circumferential wall 220 is bent in the manner discussed above with reference to FIG. 3B to form a tube and, more specifically, the tubular, circumferential wall 220. In FIG. 5A, the packaging material 212 includes a tab 228, which may be a portion of the top sheet 152 that extends beyond the first edge 222 of the packaging material 212. A peelable adhesive strip 209 is applied to an inner surface of the tab 228 and used as the adhesive strip 218. A covering is removed from the peelable adhesive strip and the inner surface of the tab 228 is attached to the outer surface 214 and, more specifically, the top sheet 152 at the second edge 224 (FIG. 4). Then, the bottom cap 250 is attached to the circumferential wall 220, as discussed above.

FIG. 5B shows the cylindrical shipping box 200 in the assembled condition (after completing the steps above) ready for packing an item-to-be-shipped 10 therein. The top cap 240 (not shown in FIG. 5B) is removed to provide access to the inner cavity 226. The item-to-be-shipped 10 is then placed into the inner cavity 226. As discussed further below, the tubular shape is advantageously used for shipping round or cylindrical objects, such as plates or bowls, for example. FIG. 5B shows a plate 12 as the item-to-be-shipped 10, and after the circumferential wall 220 is formed and, in some embodiments after the bottom cap 250 is attached to the circumferential wall 220, the item-to-be-shipped 10 may be placed into the inner cavity 226. After all the items-to-be-shipped 10 are placed in the inner cavity 226, along with any packing material 14, such as, for example, a corrugated sheet separating the plates 12, the top cap 240 may be attached. FIG. 5C shows the cylindrical shipping box 200 in the assembled condition with the top cap 240 installed. After shipping, the process can be reversed and the cylindrical shipping box 200 "knocked down" to return to components, specifically the circumferential wall 220, to its flat configuration.

Figure 6A:
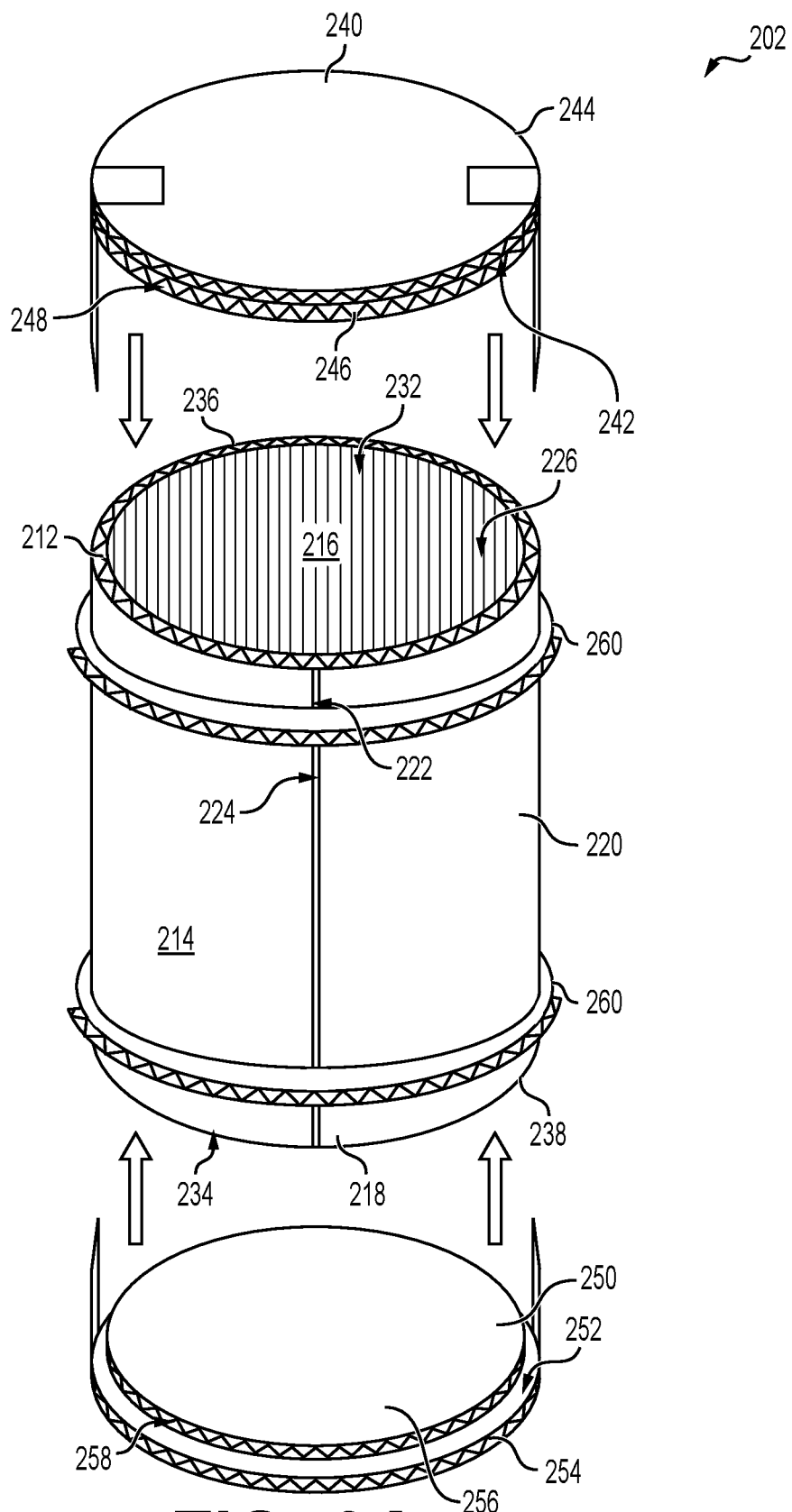
FIGS. 6A and 6B are each exploded views of another cylindrical shipping box formed from the packaging material shown in FIGS. 3A and 3B.

FIG. 6A is an exploded view of another cylindrical shipping box 202. The cylindrical shipping box 202 is similar to the cylindrical shipping box 200 discussed above. In the embodiment shown in FIGS. 4 to 5C, an adhesive strip 218, such as tape, is used to connect the first edge 222 and the second edge 224 of the packaging material 212 to form the tubular shape. The tubular shape may be held in other ways, however. As shown in FIG. 6A, for example, a removeable ring 260 may be used to maintain the tubular shape in addition or instead of using the adhesive strip 218. The ring 260 may be annular having an opening sized to correspond to the outer diameter of the circumferential wall 220. The cylindrical shipping box 202 shown in FIGS. 3A and 3B may be formed into the tubular shape and then one or more rings 260 are slid over the tubular shape to maintain the shape. The rings 260 thus circumscribe the circumferential wall 220 to maintain the circumferential wall 220 in the tubular shape. Two rings are shown in FIG. 6A and the rings 260 are located at each end of the tubular shape (i.e., circumferential wall 220), but they may be located at other portions of the tube (i.e., circumferential wall 220). These rings 260 may be a single corrugated layer formed into an annular ring 260 so that the ring 260 can be part of the kdf shipping arrangement discussed above. The ring 260 may be particularly advantageous when the cylindrical shipping box 202 is used multiple times, as the ring 260 can be readily removed without damaging the packaging to convert the cylindrical shipping box 202 from its tubular configuration back to its flat configuration. In some embodiments, the ring 260 may be integrally formed with the top cap 240 and/or the bottom cap 250.

Figure 6B:
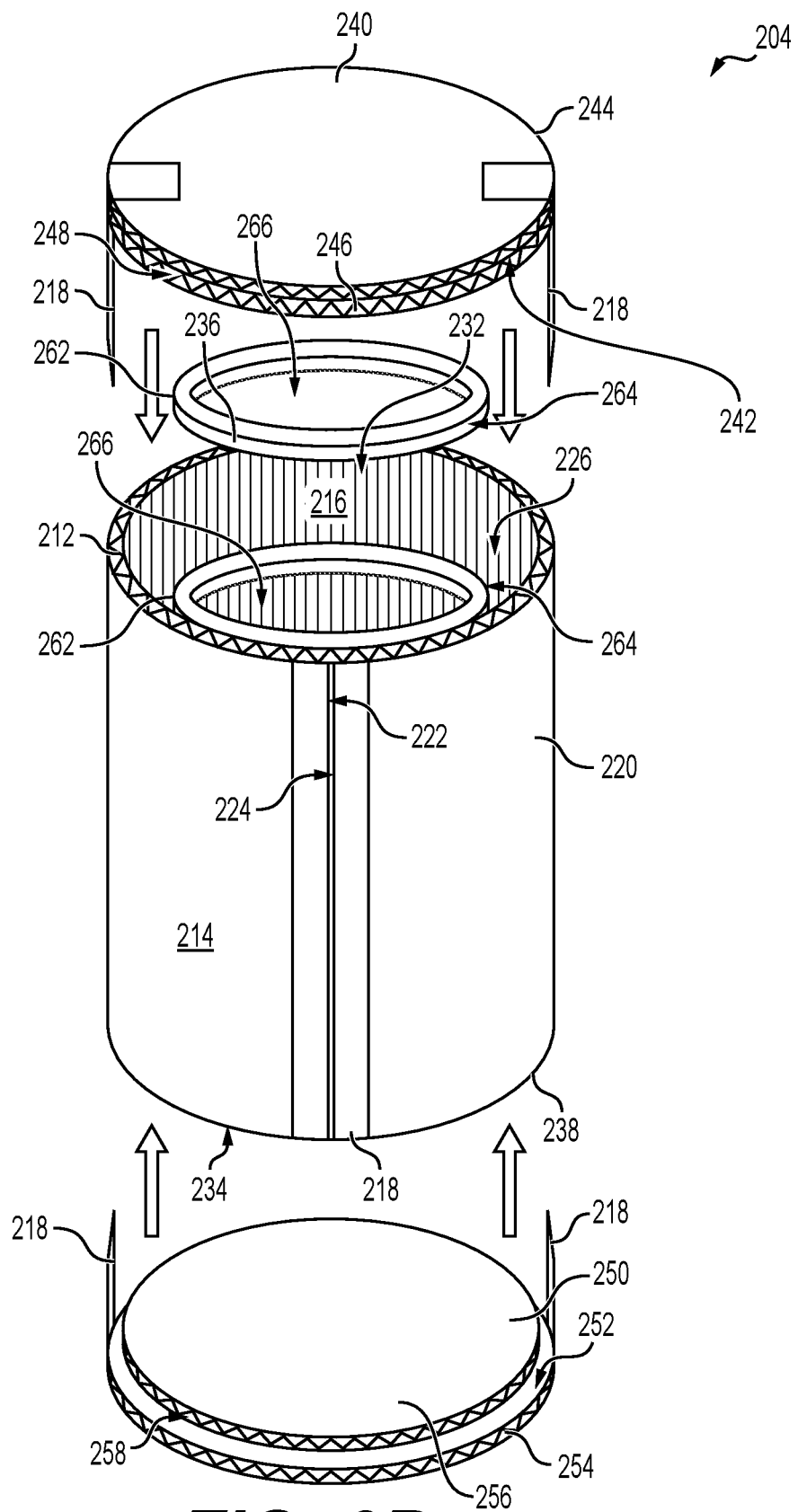

FIG. 6B is an exploded view of another cylindrical shipping box 204. The cylindrical shipping box 204 is similar to the cylindrical shipping boxes 200, 202 discussed above. In FIG. 6A, the rings 260 are shown as being placed externally to the circumferential wall 220. Additionally or alternatively, inner rings 262 can also be located within the inner cavity 226 of the circumferential wall 220. Like the inner layer 246, the outer circumferential surface of the inner ring 262 forms a bearing surface 264, similar to the bearing surface 248 of the top cap 240 and the bottom cap 250, discussed above. In an assembled configuration, the bearing surface 264 abuts the inner surface 216 of the packaging material. The inner rings 262 thus may help maintain the shape of the tube (i.e., the circumferential wall 220) and provide structural support to prevent the circumferential wall 220 from bending or collapsing. The inner rings 262 may be annular having a central opening 266 to allow the item-to-be-shipped 10 to be placed in the inner cavity 226.

Figure 7A:
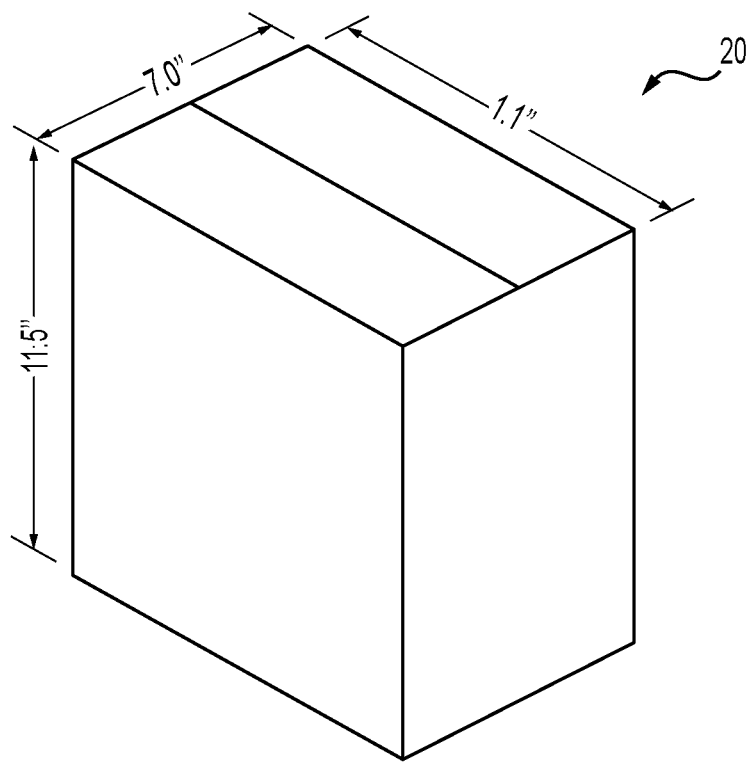
FIG. 7A shows a comparative example of a rectangular shipping box for eight plates.
Figure 7B:
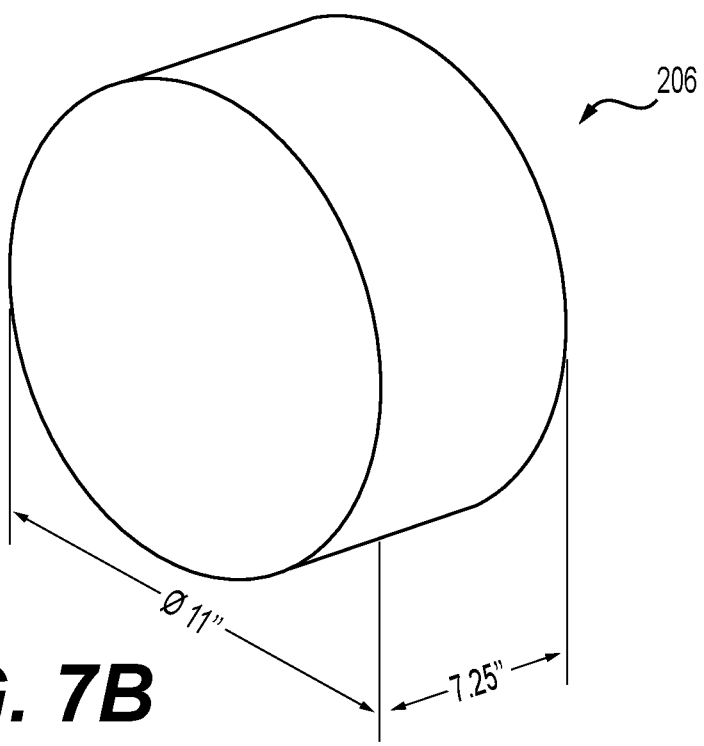
FIG. 7B shows the cylindrical shipping box of the embodiments discussed herein sized for eight plates.

As noted above, the cylindrical shipping box 200 of the embodiments discussed herein can provide for a substantial savings in shipping costs, such as the shipping costs used to transport by shipping container because more of the cylindrical shipping boxes can be fit into a shipping container than a corresponding rectangular shipping box. FIG. 7A shows a comparative example of a rectangular shipping box 20 for eight plates 12 (FIG. 5B). FIG. 7B shows a cylindrical shipping box 206 (such as one of the cylindrical shipping boxes discussed above) sized for the same eight plates 12.

Figure 8A:
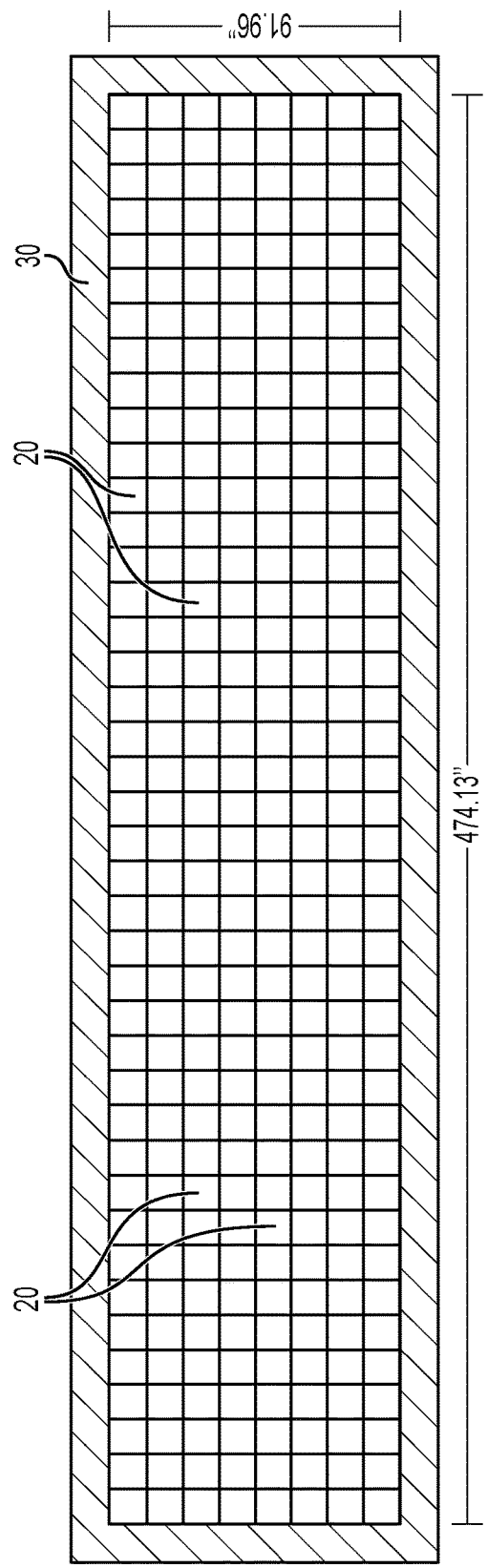
FIGS. 8A and 8B show the rectangular shipping box shown in FIG. 7A packed into a 40-foot shipping container.
Figure 8B:
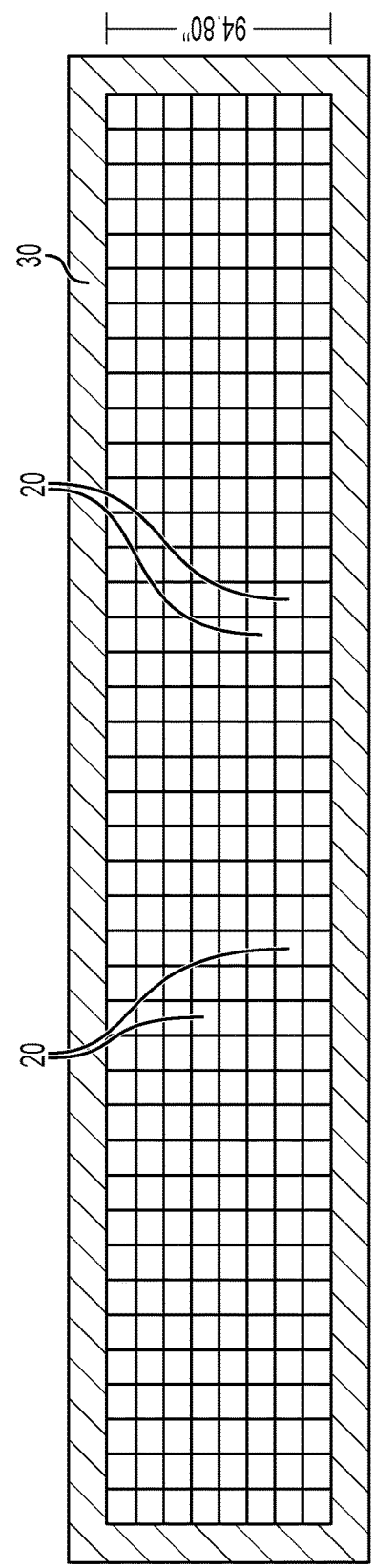

FIGS. 8A and 8B show the comparative example (the rectangular shipping box 20) in FIG. 7A packed into a 40-foot shipping container 30. FIG. 8A is a top view of the shipping container 30, and FIG. 8B is a side view of the shipping container 30. The top and side of the shipping container 30 are not illustrated, respectively, in FIGS. 8A and 8B to show the rectangular shipping box 20 stacked therein. As illustrated in FIGS. 8A and 8B, thirteen layers of boxes may be stacked in the shipping container with 328 boxes per layer, resulting in 4,264 boxes and, with eight plates in each box, 34,112 plates.

Figure 9A:
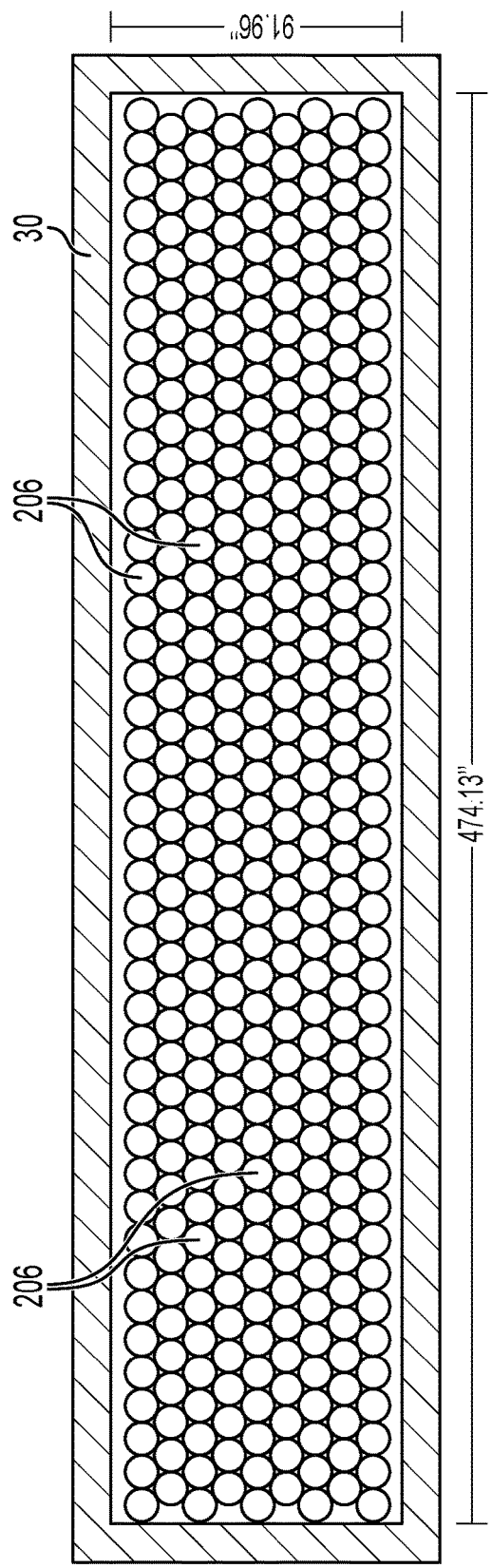
FIGS. 9A and 9B show the cylindrical shipping box shown in FIG. 7B packed into a 40-foot shipping container.
Figure 9B:
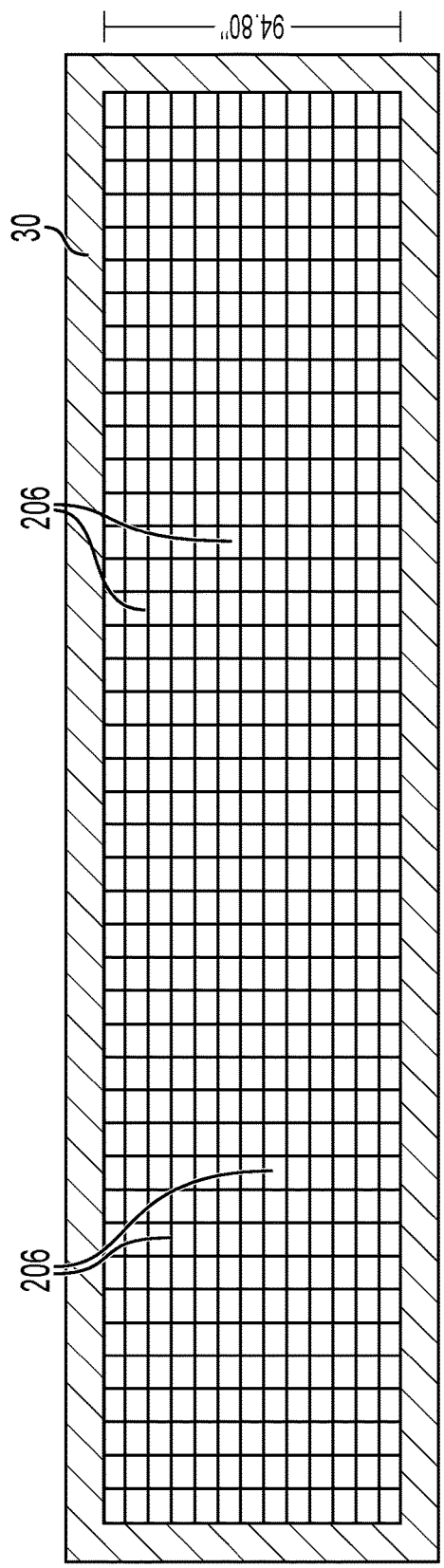

FIGS. 9A and 9B show the cylindrical shipping box 206 in FIG. 7B packed into a 40-foot shipping container 30. FIG. 9A is a top view of the shipping container 30, and FIG. 9B is a side view of the shipping container 30. The top and side of the shipping container 30 are not illustrated, respectively, in FIGS. 9a and 9B to show the cylindrical shipping box 206 stacked therein. As illustrated in FIGS. 9A and 9B, thirteen layers of boxes may be stacked in the shipping container with 383 boxes per layer, resulting in 4,979 boxes and, with eight plates in each box, 39,832 plates. As can be seen in these examples, the cylindrical shipping box 206 of the embodiments discussed herein allows for more shipping boxes and thus more plates 12 to be shipped in the 40-foot shipping container 30, than rectangular shipping box 20 sized to ship the same number of plates 12 in each box.

Figure 10A:
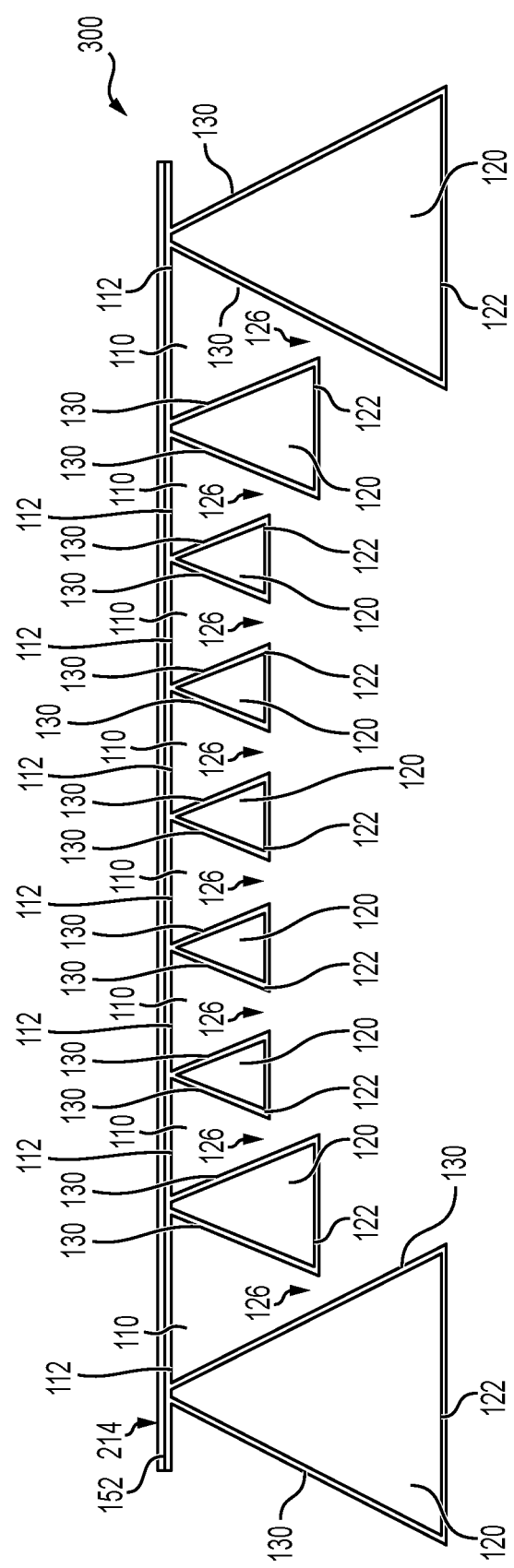
FIGS. 10A and 10B show a variation of the packaging material of FIGS. 3A and 3B.
Figure 10B:
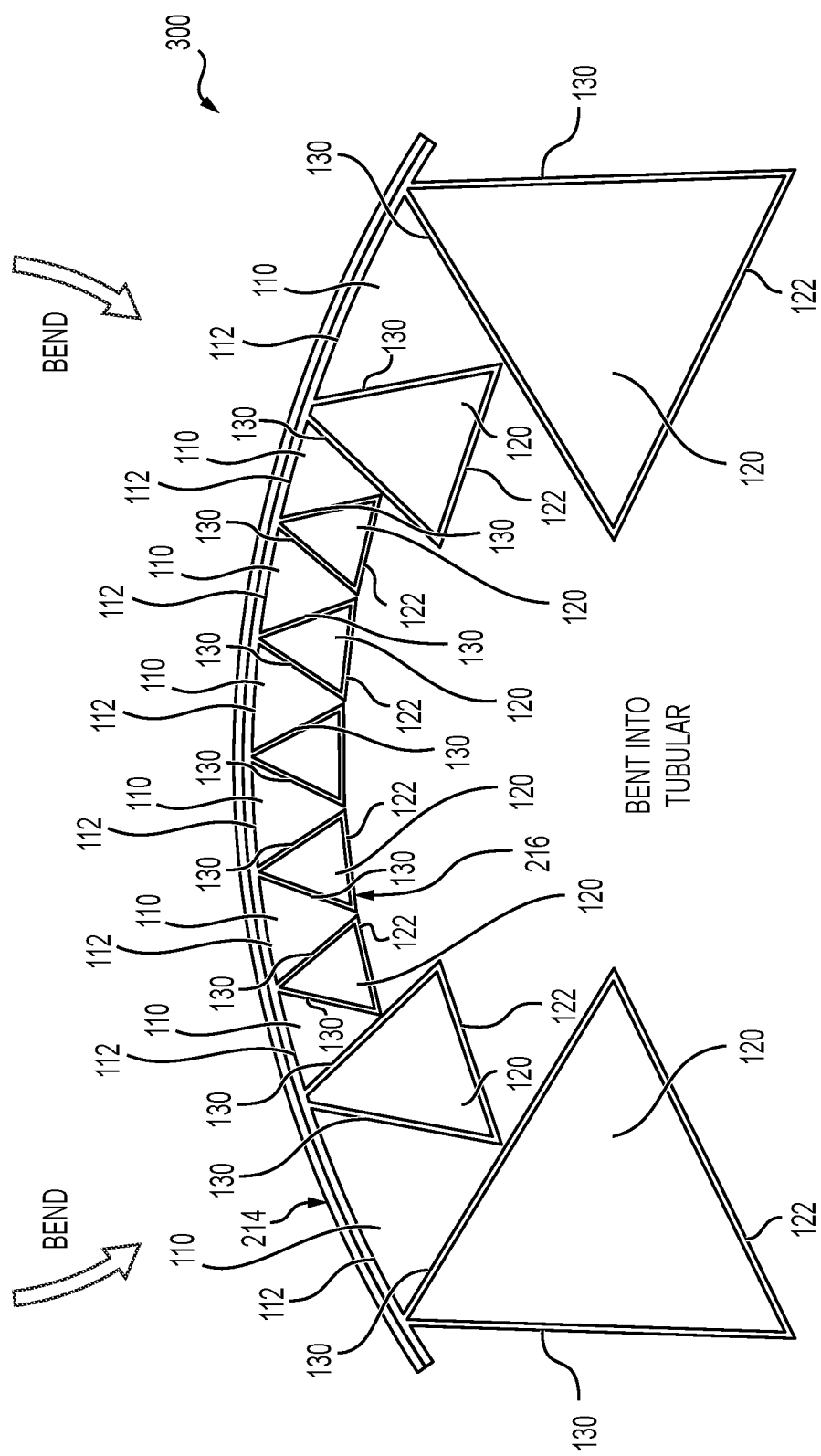

FIGS. 10A and 10B show another packaging material 300 that may be used to form the cylindrical shipping boxes discussed above, such as the cylindrical shipping box 200 shown in FIGS. 4 to 5C, for example. FIG. 10A shows the packaging material 300 in a flat configuration, and FIG. 10B shows the packaging material 300 in a tubular configuration. The packaging material 300 is a variation of the packaging material of FIGS. 3A and 3B and is similar to the packaging material 212 discussed above. In the embodiments discussed above, each of the second triangular cells 120 has the same size. In this embodiment, the second triangular cells 120 have a plurality of different sizes. For example, the transverse walls 130 may be of different lengths for different second triangular cells 120 and the second base portion 122 may have different lengths for different second triangular cells 120. Where an object-to-be-shipped 10 (FIG. 5B) is placed in the cylindrical shipping box 200, there may be void space between the object-to-be-shipped 10 and the inner surface 216 of the circumferential wall 220. In such a case, a void fill material may be added to secure the object-to-be-shipped 10 within the cylindrical shipping box 200. The need to use void fill may particularly be the case where the object-to-be shipped 10 has an irregular shape. The plurality of sizes of second triangular cells 120 may be arranged to secure the object-to-be-shipped 10 in the cylindrical shipping box 200 eliminating or at least reducing the need for void fill.

Figure 11A:
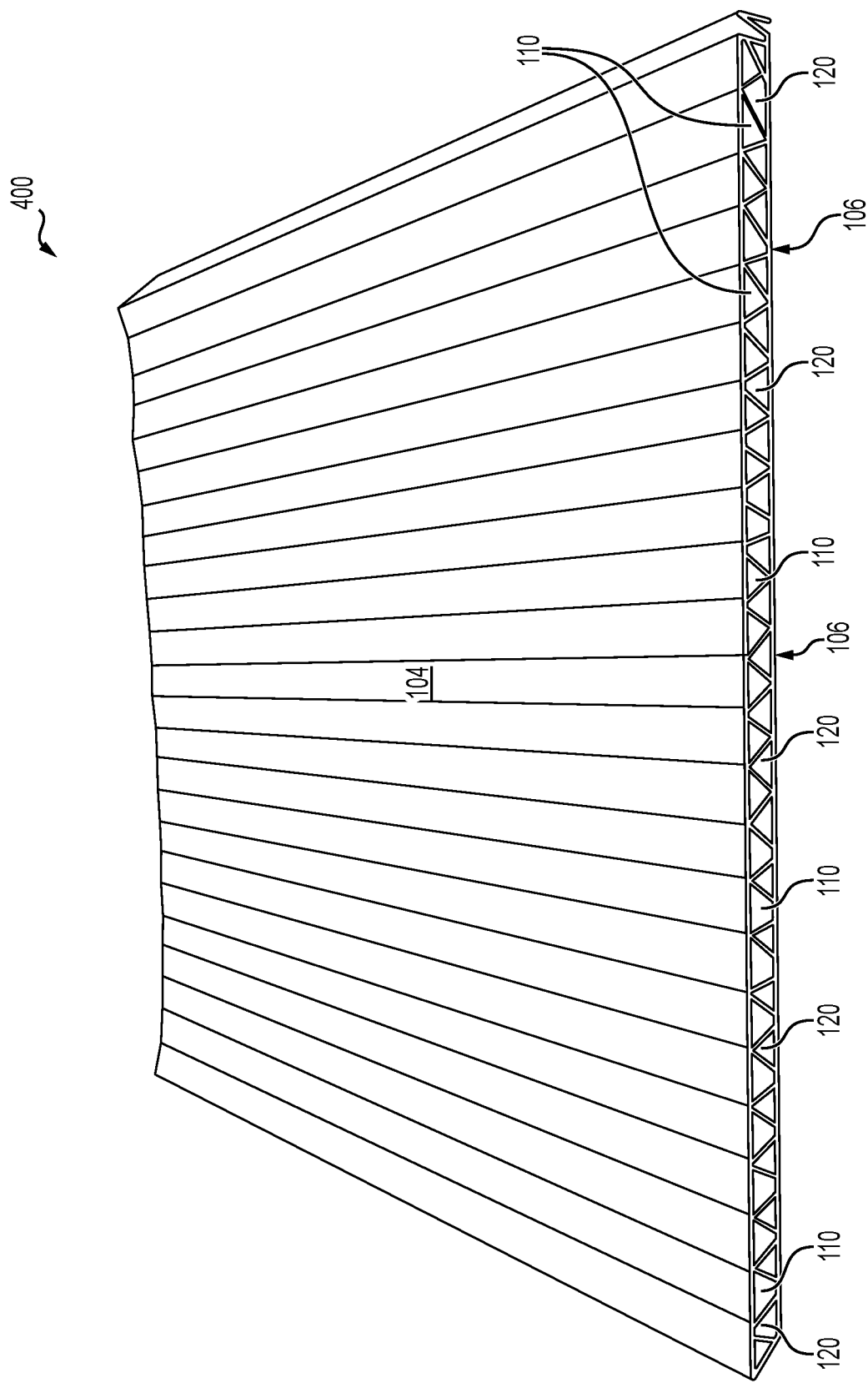
FIGS. 11A and 11B show another packaging material according to another embodiment.
Figure 11B:
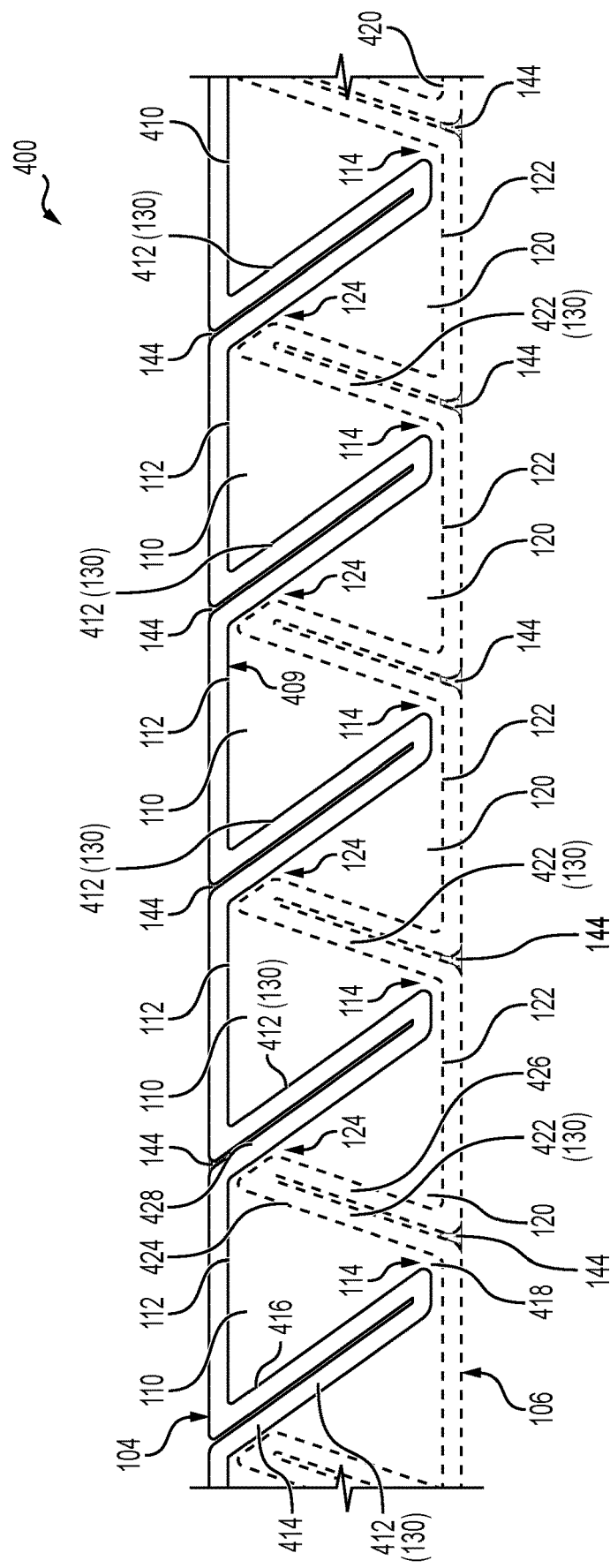

FIGS. 11A and 11B show another packaging material 400 according to another embodiment. FIG. 11A is a perspective view of the packaging material 400, and FIG. 11B is an end view of the packaging material 400. The packaging material 400 of this embodiment is similar to the packaging material 100 discussed above with reference to FIG. 1, but instead of being formed from a single sheet of single-walled corrugated fiberboard, the packaging material 400 shown in FIGS. 11A and 11B is formed from two sheets of single-walled corrugated fiberboard to form the plurality of first triangular cells 110 and the plurality of second triangular cells 120. The packaging material 400 includes a first sheet 410 and a second sheet 420 positioned to oppose each other. The first sheet 410, which also may be referred to as a top sheet, is shown with solid lines in FIG. 11B, and the second sheet 420, which also may be referred to as a bottom sheet, is shown with broken lines in FIG. 11B. The first sheet 410 includes the first base portions 112, forming the first surface (e.g., the top surface 104), and the second sheet 420 includes the second base portions 122, forming the second surface (e.g., the bottom surface 106).

Each of the first sheet 410 and the second sheet 420 are folded corrugated sheets, and include folded projections, which are pleats or areas of each sheet folded over itself. These folded projections are referred to herein as fins. The first sheet 410 includes a plurality of fins, which are referred to herein as first fins 412, and the second sheet 420 includes a plurality of fins, which are referred to herein as second fins 422. The first fins 412 are arranged parallel to each other, and the second fins 422 also are arranged parallel to each other. The first fins 412 are separated from each other by the first base portion 112, and the second fins 422 are separated from each other by the second base portion 122. The first fins 412 are connected to ends of adjacent first base portions 112 and, as noted above, may be formed by folding the first sheet 410.

The first fins 412 may thus have a V-shape or a U-shape and include a first leg 414 extending from one of the first base portions 112 and a second leg 416 extending from an adjacent first base portion 112. The first leg 414 connects to the second leg 416 at a peak 418. As will be discussed below, the first leg 414 and the second leg 416 collectively form the transverse walls 130 of one of the first triangular cells 110 and one of the second triangular cells 120. The peak 418 is thus an end portion of the transverse wall 130 that is a distal end located away from the base portion, more specifically the first base portion 112. The end of each of the first leg 414 and the second leg 416 that is connected to the first base portion 112 is a base end portion or proximal end portion. The first leg 414 and the second leg 416 may be continuously connected to each other at the peak 418 and are a continuation of the same corrugated material at the peak 418 without being cut or separated.

Other portions of the first leg 414 and the second leg 416 (beyond the peak 418) may also be connected to each other. For example, an adhesive may be applied between an interior surface of the first leg 414 and an interior surface of the second leg 416. Although the adhesive may be applied to the full length of the interior surface of the first leg 414 and/or the interior surface of the second leg 416, the adhesive 144 in this embodiment is applied between adjacent first base portions 112 (depicted once in FIG. 11B for clarity). In this way, the first leg 414 and the second leg 416 is also connected to each other at the base end portion. Connecting the first leg 414 and the second leg 416 at the base end portion helps prevent the first sheet 410 from spreading out when a force is applied to the peak 418, for example, and thus provides rigidity to the first sheet 410 and a protective (cushioning) effect for the packaging material 400 overall.

The forgoing discussion of the first fins 412 also applies to the second fins 422, and each of the second fins 422 includes a first leg 424, a second leg 426, and a peak 428, similar to the first leg 414, the second leg 416, and the peak 418, respectively.

The first fins 412 project from the first base portion 112 on the same side of the first sheet 410, and similarly, the second fins 422 of the second sheet 420 project from the second base portion 122 on the same side of the second sheet 420. The first sheet 410 and the second sheet 420 are positioned to oppose each other with the first fins 412 projecting towards the second sheet 420 and the second fins 422 projecting towards the first sheet 410. The distal end (i.e., the peak 418) of the first fins 412 may be positioned to contact an inner surface 429 of the second sheet 420, and likewise, the distal end (i.e., the peak 428) of the second fins 422 may be positioned to contact an inner surface 419 of the first sheet 410. The inner surface 419 of the first sheet 410 may be an inner surface of each first base portion 112, and similarly, the inner surface 429 of the second sheet 420 may be an inner surface of each second base portion 122. At least one of the first fins 412 or the second fins 422 may be positioned at an oblique angle with the inner surface 419 or inner surface 429, respectively, to form the plurality of triangular cells of the packaging material 400 (i.e., the first triangular cells 110 and the second triangular cells 120). As depicted in FIGS. 11A and 11B, both the first fins 412 or the second fins 422 are positioned at an oblique angle with the inner surface 419 or inner surface 429, respectively. More specifically, the peak 418 of the first fins 412 is positioned to form the first apex 114, such as at one end of the second base portion 122, and similarly the peak 428 of the second fins 422 is positioned to form the second apex 124, such as at one end of the first base portion 112.

An adhesive 144 may be applied at the peaks 418 of the first fins 412 and the peaks 428 of the second fins 422 to attach the first sheet 410 to the second sheet 420. As noted above, the adhesive 144 may be applied at other locations. The bonding, using the adhesive 144, may however, be selectively applied, and the first fins 412 and second fins 422 may be bonded (e.g., glued) or unbonded (e.g., unglued) or a mix of both. For example, cushioning for the strong triangular construction can be created as needed by leaving air spaces between the folds on the vertically oriented parts of the corrugated sheet or by not gluing some of them to the horizontal planes. A top sheet 152 (paper sheet) and a bottom sheet 154 (paper sheet) shown and discussed above with reference to FIG. 2D, may also be used with the packaging material 400 shown in FIGS. 11A and 11B, but as shown in this embodiment, there are a large number of interior gluing surfaces that would obviate the need for the top sheet 152 and the bottom sheet 154.

The packaging material 400 shown in FIGS. 11A and 11B or the packaging material 100 shown in FIG. 1 above, may replace the traditional three-layer construction of corrugated material (triple-walled boxes) with two layers of corrugated material. The result is thinner, lower cube packaging which leads to significant savings in transportation and storage costs, as well as less energy consumption. Such savings is shown, for example, in the table below comparing the packaging material of this embodiment with double-wall shipping containers or triple-wall shipping containers.

| Comparisons | Packaging Material 400 | Double Wall | Triple Wall |
| --- | --- | --- | --- |
| Thickness (±0.5 mm) | 4.5 mm | 6.5 mm | 9.5 mm |
| Fourth Embodiment savings on a 4 cubic foot box (12" × 24" × 24") | — | 2.6% | 6.5% |
| Fourth Embodiment savings on a 40' container (China to NY) | — | $90 | $225 |

FIGS. 12A and 12B show a packaging material 402 that may be used to form the circumferential wall 220 (FIG. 4) of a cylindrical shipping box 200 (FIG. 4) discussed above. Like the packaging material 100 shown in FIG. 1, the two-sheet packaging material 400 discussed above with reference to FIGS. 11A and 11B may also be modified to be used to form the circumferential wall 220 of a "knock-down-flat" ("kdf") shipping box (cylindrical shipping box 200), and the packaging material 402 shown in FIGS. 12A and 12B depicts such a modification. The packaging material 402 is similar to the packaging material 400 discussed above. The same reference numerals will be used for the same and similar components and features, and a detailed description of these features is omitted here.

The packaging material 402 is configurable in a flat configuration, shown in FIG. 12A, and a tubular configuration, shown in FIG. 12B. In the flat configuration, adjacent second base portions 122 are spaced apart from each other and a second-side gap 126 is maintained between adjacent second base portions 122. Adjacent second base portion 122 are not bonded to each other and, similarly, the first leg 424 and the second leg 426 of the second fins 422 are not adhered to each other and free from attachment at the base portion. In the flat configuration, the first leg 424 and the second leg 426 of the second fins 422 are thus spaced apart from each other. To form this spaced-apart arrangement when flat, the first base portion 112 is longer than the second base portion 122.

The packaging material 402 can be bent to form an arcuate shape, such as a tubular shape (see FIG. 4), as shown in FIG. 12B. As the packaging material 402 is bent, the second base portions 122 are brought closer to each other reducing the length of the second-side gaps 126 between the first leg 424 and second leg 426. In some embodiments, the second base portion 122 may be brought into contact with each other (i.e., the second base portions 122 abut each other), closing the second-side gaps 126. With the first leg 424 and the second leg 426 being free from attachment as discussed above, the packaging material 402 can move back and forth between the arcuate (or tubular) configuration shown in FIG. 12B and the flat configuration shown in FIG. 12A.

Although described using corrugated sheet, the packaging material of this embodiment may use other sheets including relatively thick sheets of paper (e.g., non-corrugated paperboard). In addition, although the packaging materials discussed herein have been described as being formed from cellulosic sheets and, more specifically, corrugated fiberboard, other materials, however, may be used to form the shipping boxes discussed herein. For example, plastic sheets may be used.

Although the described as a packaging material, the embodiments discussed herein may also be used as a packing material to provide additional cushioning or void fill. In such a case, the materials discussed herein are placed inside a shipping box around the item-to-be-shipped 10.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A knock-down-flat cylindrical shipping box comprising:
   a circumferential wall including an outer surface and an inner surface, the circumferential wall being configurable in a flat configuration and a tubular configuration, when the circumferential wall is in the tubular configuration the inner surface defines an inner cavity for an item-to-be-shipped to be placed therein and forms a top-end opening and a bottom-end opening;
   a top cap attachable to the circumferential wall in the tubular configuration to close the top-end opening; and
   a bottom cap attachable to the circumferential wall in the tubular configuration to close the bottom-end opening,
   wherein the circumferential wall is formed of a packaging material that includes a plurality of base portions, the inner surface being formed by the plurality of base portions,
   wherein, in the flat configuration, adjacent base portions of the plurality of base portions are spaced apart from each other and a gap is formed between the adjacent base portions, and
   wherein, in the tubular configuration, the adjacent base portions are brought closer to each other than in the flat configuration, reducing the size of the gap between the adjacent base portions.

2. The cylindrical shipping box of claim 1, wherein, in the tubular configuration, the adjacent base portions abut each other.

3. The cylindrical shipping box of claim 1, wherein the plurality of base portions is a plurality of second base portions and the packaging material further includes a plurality of first base portions, the outer surface being formed by the plurality of first base portions.

4. The cylindrical shipping box of claim 3, wherein an adhesive is applied between adjacent first base portions of the plurality of first base portions to bond the plurality of first base portions to each other, and adjacent second base portions of the plurality of second base portions are free from an adhesive between the adjacent second base portions.

5. The cylindrical shipping box of claim 3, wherein a first base portion of the plurality of first base portions is longer than a corresponding second base portion of the plurality of second base portions.

6. The cylindrical shipping box of claim 3, wherein the plurality of first base portions and the plurality of second base portions are formed in the same continuous sheet, and
   wherein the packaging material further includes a plurality of transverse walls, each transverse wall connecting one first base portion of the plurality of first base portions with one second base portion of the plurality of second base portions.

7. The cylindrical shipping box of claim 6, wherein the plurality of first base portions and the plurality of second base portions are positioned relative to each other to form a plurality of triangular cells with the plurality of transverse walls.

8. The cylindrical shipping box of claim 7, wherein the plurality of triangular cells include a plurality of different sizes of triangular cells.

9. The cylindrical shipping box of claim 7, wherein two transverse walls of the plurality of transverse walls are positioned together opposite a corresponding base portion of the plurality of first base portions and the plurality of second base portions to form an apex of each triangular cell.

10. The cylindrical shipping box of claim 9, wherein the angle between the two transverse walls of the plurality of transverse walls at the apex is acute.

11. The cylindrical shipping box of claim 9, wherein the angle between the two transverse walls of the plurality of transverse walls at the apex is obtuse.

12. The cylindrical shipping box of claim 3, wherein the plurality of first base portions is formed in a first sheet, and the plurality of second base portions is formed in a second sheet.

13. The cylindrical shipping box of claim 12, wherein the second sheet includes a plurality of second fins, each second fin of the plurality of second fins connects adjacent second base portions of the plurality of first base portions.

14. The cylindrical shipping box of claim 13, wherein each of the plurality of second fins comprise a first leg and a second leg connected to each other at a peak, each of the first leg and the second leg having a base end portion at an end opposite the peak, and
wherein, in the flat configuration, the gap is formed between the base end portion of the first leg and the base end portion of the second leg.

15. The cylindrical shipping box of claim 12, wherein the first sheet includes a plurality of first fins and the second sheet includes a plurality of second fins, the first sheet and the second sheet being positioned to oppose each other with the plurality of first fins projecting towards the second sheet and the plurality of second fins projecting towards the first sheet.

16. The cylindrical shipping box of claim 15, wherein the plurality of first fins and the plurality of second fins are arranged to form a plurality of triangular cells, the plurality of first fins and the plurality of second fins forming transverse walls of the plurality of triangular cells.

17. The cylindrical shipping box of claim 15, wherein each first fin of the plurality of first fins connects adjacent first base portions of the plurality of first base portions, and each second fin of the plurality of second fins connects adjacent second base portions of the plurality of second base portions.

18. The cylindrical shipping box of claim 1, further comprising an annular ring, wherein the tubular configuration, the annular ring circumscribes the circumferential wall to maintain the circumferential wall in the tubular shape.

19. A convertible packaging material comprising:
an outer wall section having an outer surface formed thereon; and
an inner wall section formed of a plurality of segments, wherein the packaging material is convertible between a flat state and a tubular state, and
wherein, in the tubular state the, the inner wall section forms an inner surface defining an inner cavity,
wherein the plurality of segments is a plurality of base portions, the inner surface being formed by the plurality of base portions,
wherein, in the flat state, adjacent base portions of the plurality of base portions are spaced apart from each other and a gap is formed between the adjacent base portions, and
wherein, in the tubular configuration, the adjacent base portions are brought closer to each other than in the flat configuration, reducing the size of the gap between the adjacent base portions.

20. The convertible packaging material of claim 19, wherein the outer wall section is formed in a first sheet, and the plurality of base portions is formed in a second sheet, the second sheet including a plurality of fins, each fin connecting adjacent portions of the plurality of base portions, and
wherein the first sheet and the second sheet are positioned to oppose each other with the plurality of fins projecting towards the first sheet.

21. The convertible packaging material of claim 19, wherein the plurality of base portions is a plurality of second base portions and the outer wall section includes a plurality of first base portions, the plurality of first base portions and the plurality of second base portions being formed in the same continuous sheet, and
wherein the packaging material further includes a plurality of transverse walls, each transverse wall connecting one first base portion of the plurality of first base portions with one second base portion of the plurality of second base portions.

* * * * *